United States Patent
McAdoo

(10) Patent No.: US 10,351,238 B2
(45) Date of Patent: Jul. 16, 2019

(54) UAV CONFIGURATIONS AND BATTERY AUGMENTATION FOR UAV INTERNAL COMBUSTION ENGINES, AND ASSOCIATED SYSTEMS AND METHODS

(71) Applicant: Endurant Systems, LLC, Alamo, CA (US)

(72) Inventor: Gregory Leonard McAdoo, Alamo, CA (US)

(73) Assignee: Endurant Systems LLC., Alamo, CA (US)

( * ) Notice: Subject to any disclaimer, the term of this patent is extended or adjusted under 35 U.S.C. 154(b) by 207 days.

(21) Appl. No.: 15/261,780

(22) Filed: Sep. 9, 2016

(65) Prior Publication Data
US 2017/0066531 A1 Mar. 9, 2017

Related U.S. Application Data

(63) Continuation of application No. PCT/US2015/019004, filed on Mar. 5, 2015.
(Continued)

(51) Int. Cl.
*B64C 39/02* (2006.01)
*B64C 27/08* (2006.01)
(Continued)

(52) U.S. Cl.
CPC ............ *B64C 39/024* (2013.01); *B64C 27/08* (2013.01); *B64C 27/26* (2013.01);
(Continued)

(58) Field of Classification Search
CPC ............ B64C 39/024; B64C 2201/044; B64C 2201/042; B64C 2201/021;
(Continued)

(56) References Cited

U.S. PATENT DOCUMENTS 5,672,086 A 9/1997 Dixon
5,964,721 A 10/1999 Augustine
(Continued)

FOREIGN PATENT DOCUMENTS

CN 101746507 6/2010
CN 202334421 * 7/2012
(Continued)

OTHER PUBLICATIONS

European Search Report for European Patent Application No. 15762275.4, Applicant: Endurant Systems, LLC., dated Nov. 16, 2017, 9 pages.
(Continued)

*Primary Examiner* — Muhammad Shafi
(74) *Attorney, Agent, or Firm* — Perkins Coie LLP

(57) ABSTRACT

UAV configurations and battery augmentation for UAV internal combustion engines, and associated systems and methods are disclosed. A representative configuration includes a fuselage, first and second wings coupled to and pivotable relative to the fuselage, and a plurality of lift rotors carried by the fuselage. A representative battery augmentation arrangement includes a DC-powered motor, an electronic speed controller, and a genset subsystem coupled to the electronic speed controller. The genset subsystem can include a battery set, an alternator, and a motor-gen controller having a phase control circuit configurable to rectify multiphase AC output from the alternator to produce rectified DC feed to the DC-powered motor. The motor-gen controller is configurable to draw DC power from the battery set to produce the rectified DC feed.

14 Claims, 24 Drawing Sheets

Related U.S. Application Data

(60) Provisional application No. 61/952,675, filed on Mar. 13, 2014, provisional application No. 62/037,021, filed on Aug. 13, 2014.

(51) Int. Cl.

| | | |
|---|---|---|
| *B64D 27/24* | (2006.01) | |
| *B64C 27/26* | (2006.01) | |
| *B64C 29/00* | (2006.01) | |
| *B64C 39/04* | (2006.01) | |
| *H02J 7/14* | (2006.01) | |
| *H02J 7/34* | (2006.01) | |
| *B64D 45/00* | (2006.01) | |
| *H02K 7/18* | (2006.01) | |
| *B64D 27/02* | (2006.01) | |
| *B64D 27/04* | (2006.01) | |

(52) U.S. Cl.
CPC .......... *B64C 29/0033* (2013.01); *B64C 39/04* (2013.01); *B64D 27/24* (2013.01); *B64D 45/00* (2013.01); *H02J 7/14* (2013.01); *H02J 7/34* (2013.01); *H02K 7/1815* (2013.01); *B64C 2201/021* (2013.01); *B64C 2201/027* (2013.01); *B64C 2201/042* (2013.01); *B64C 2201/044* (2013.01); *B64C 2201/141* (2013.01); *B64D 27/04* (2013.01); *B64D 2027/026* (2013.01); *B64D 2045/0085* (2013.01); *B64D 2221/00* (2013.01); *Y02T 50/64* (2013.01)

(58) Field of Classification Search
CPC ... B64C 2201/027; B64C 39/04; B64C 27/26; B64C 29/0033; B64C 27/08; B64C 2201/141; H02K 7/1815; H02J 7/14; H02J 7/34; Y02T 50/64; B64D 2221/00; B64D 2027/026; B64D 45/00; B64D 27/24; B64D 2045/0085; B64D 27/04
USPC .......................................................... 701/3
See application file for complete search history.

(56) References Cited

U.S. PATENT DOCUMENTS

| | | | |
|---|---|---|---|
| 5,974,723 A | 11/1999 | Taibi | |
| 6,270,038 B1 | 8/2001 | Cycon et al. | |
| 6,543,588 B1* | 4/2003 | Raad | B60L 7/00 180/65.22 |
| 2005/0039630 A1 | 2/2005 | Kumar et al. | |
| 2005/0119806 A1 | 6/2005 | Nasr et al. | |
| 2005/0127880 A1* | 6/2005 | Colley | H02J 3/02 322/7 |
| 2005/0162106 A1* | 7/2005 | Cho | B60K 6/46 318/139 |
| 2010/0147993 A1 | 6/2010 | Annati et al. | |
| 2011/0001001 A1 | 1/2011 | Bryant | |
| 2012/0209456 A1 | 8/2012 | Harmon et al. | |
| 2013/0062938 A1* | 3/2013 | Kumar | B60K 6/46 307/9.1 |

FOREIGN PATENT DOCUMENTS

| | | |
|---|---|---|
| JP | 2009295686 A | 12/2009 |
| WO | WO-0249184 A1 | 6/2002 |

OTHER PUBLICATIONS

International Search Report and Written Opinion for International Patent Application No. PCT/US2015/019004, Applicant: Endurant Systems, LLC., dated Mar. 5, 2015, 23 pages.
Warwick, Graham, "Inside Airbus A3's Vahana Electric VTOL," Aviation Week & Space Technology, May 1, 2017, 6 pages.
Warwick, Graham, "NASA Plans Tests of Distributed Electric Propulsion", Aviation Week (http://m.aviationweek.com/aviation-week-space-technology), Jul. 10, 2014.

* cited by examiner

UAV CONFIGURATIONS AND BATTERY AUGMENTATION FOR UAV INTERNAL COMBUSTION ENGINES, AND ASSOCIATED SYSTEMS AND METHODS

CROSS-REFERENCE TO RELATED APPLICATION(S)

This application is a continuation of International Patent Application No. PCT/US2015/019004, entitled "UAV CONFIGURATIONS AND BATTERY AUGMENTATION FOR UAV INTERNAL COMBUSTION ENGINES, AND ASSOCIATED SYSTEMS AND METHODS," and filed on Mar. 5, 2015, which claims priority to U.S. Provisional Patent Application No. 61/952,675, entitled "BATTERY AUGMENTATION FOR INTERNAL COMBUSTION ENGINE, AND ASSOCIATED SYSTEMS AND METHODS" and filed on Mar. 13, 2014, and U.S. Provisional Patent Application No. 62/037,021, entitled "BATTERY AUGMENTATION FOR INTERNAL COMBUSTION ENGINE, AND ASSOCIATED SYSTEMS AND METHODS" and filed on Aug. 13, 2014, each of which are incorporated by reference herein in their entirety.

TECHNICAL FIELD

This disclosure relates generally to DC power supplies for driving motors, and in particular to a DC power supply for an unmanned aerial vehicle (UAV) with multiple rotors. The DC power supply can be used to power a variety of UAVs, including UAVs with combinations of variable-incidence wings and multiple rotors.

BACKGROUND

Conventional power supplies for multi-rotor UAVs are generally direct current (DC) batteries. However, most batteries have limited energy density. Accordingly, a battery-only power source provides limited endurance and cannot sustain long range travel for the UAV. Other alternative power sources used by existing multi-rotor vehicles introduce additional problems, such as unpredictable fluctuations in the power supplied to the rotors, thus causing instability in flight.

SUMMARY

Disclosed are DC power supply systems (e.g., a genset subsystem of a UAV) that utilizes high energy density liquid fuel to increase the travel endurance of multi-rotor vehicles. The disclosed DC power supply system includes a lightweight and high powered energy conversion pipeline that drives an electronic powertrain. The energy conversion pipeline is at least partially powered by liquid fuel. In at least one embodiment, the energy conversion pipeline includes an internal combustion engine (ICE) and a brushless direct current (BLDC) alternator. Embodiments of the disclosed DC power supply system also include a battery module having one or more batteries. Embodiments of the disclosed DC power supply system provides a stable DC voltage to drive multiple rotors under various operational modes including an Engine Start Mode, a generator only mode, a generator-based ripple mitigation mode, a generator with automated Battery Augmentation Mode, a generator with Assisted Augmentation Mode, a Battery-Only Mode, or any combination thereof.

The disclosed DC power supply system can implement a hybrid vehicle power supply that uses both an internal combustion engine and a set of batteries. This implementation is superior to traditional hybrid power supplies that are "in series", where an internal combustion engine charges a battery, and a motor is driven only by the power supplied from the battery. This implementation is also superior to traditional hybrid power supplies that operate as "alternatives" of one another, where the motor is driven either by the ICE or the battery.

Some embodiments of the disclosure have other aspects, elements, features, and steps in addition to or in place of what is described above. Several of these potential additions and replacements are described throughout the rest of the specification

Figure 1A:
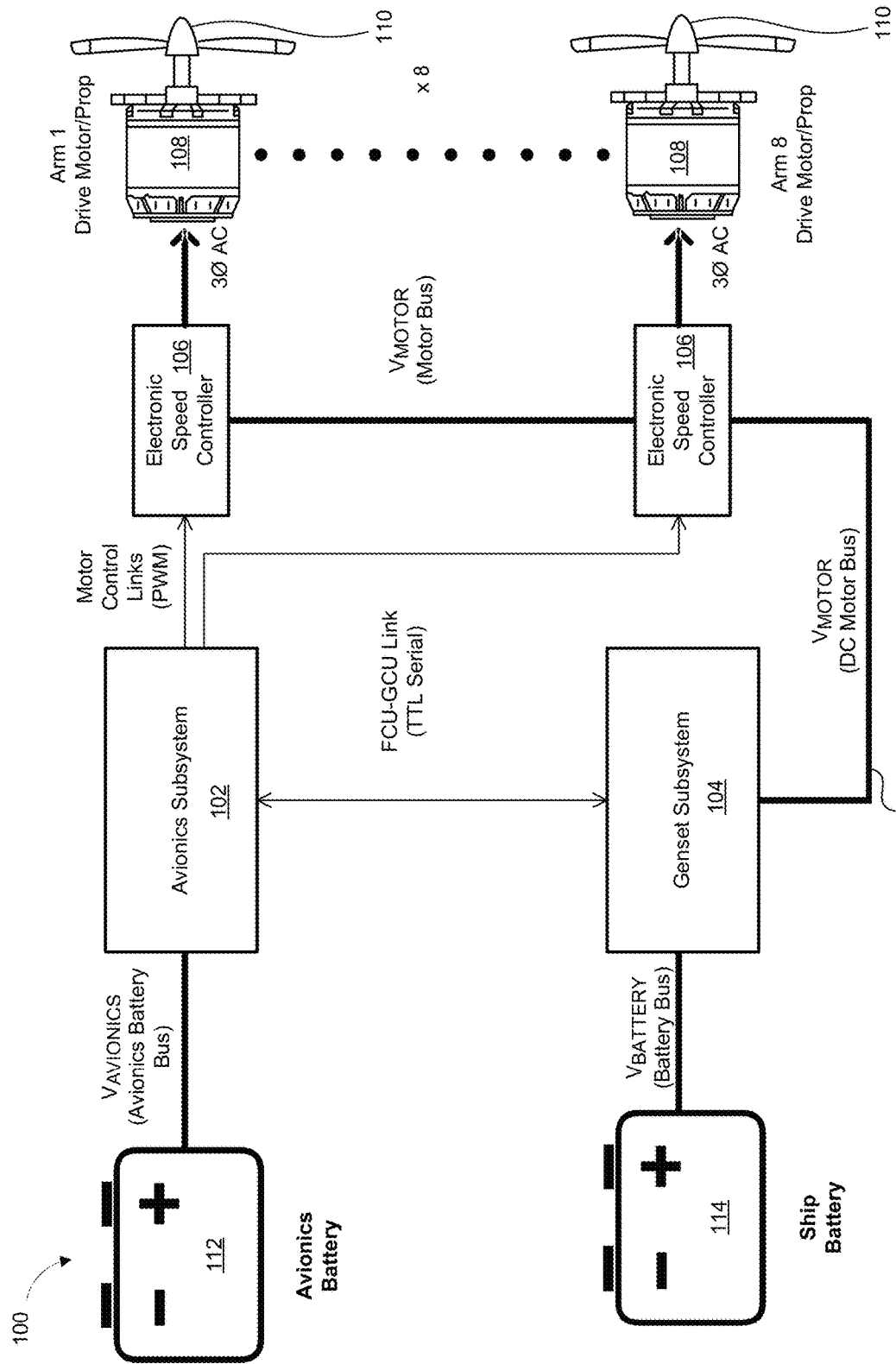
FIG. 1A is a block diagram of a representative system architecture of a multi-rotor vehicle, in accordance with at least some embodiments.

The figures depict various embodiments for purposes of illustration only. One skilled in the art will readily recognize from the following discussion that alternative embodiments of the structures and methods illustrated herein may be employed without departing from the principles of the disclosure described herein.

DETAILED DESCRIPTION

The present technology is directed generally to unmanned aerial vehicle (UAV) configurations and battery augmentation for UAV internal combustion engines. Several details describing structures and processes that are well-known and often associated with these types of systems and processes, but that may unnecessarily obscure some significant aspects of the presently disclosed technology, are not set forth in the following description for purposes of clarity. Furthermore, although the following disclosure sets forth several embodiments of different aspects of the disclosed technology, several other embodiments can have different configurations and/or different components than those described in this section. Accordingly, the disclosed technology may include other embodiments with additional elements not described below with reference to FIGS. 1A-23 and/or without several of the elements described below with reference to FIGS. 1A-23.

Several embodiments of the technology described below may take the form of computer-executable instructions, including routines executed by a programmable computer and/or controller. For example, embodiments relating to methods of powering, controlling, flying and/or otherwise operating a UAV can be implemented via computer-executable instructions. Persons having ordinary skill in the relevant art will appreciate that the technology can be practiced on computer and/or controller systems other than those described below. The disclosed technology can be embodied in a special-purpose computer, controller or data processor that is specifically programmed, configured or constructed to perform one or more of the computer-executable instructions. Accordingly, the terms "computer" and "controller" as generally used herein refer to any suitable data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium.

The technology can also be practiced in distributed environments, where tasks or modules are performed by remote processing devices that are linked through a communications network. For example, a controller in a system in accordance with the present disclosure can be linked with and control other components in the system. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks.

1.0 Overview

The present disclosure describes both UAV configurations and power systems to provide battery augmentation for internal combustion engines used by UAVs. In some embodiments, the disclosed UAV configurations include the battery augmentation systems, and in other embodiments, the disclosed UAV configurations need not include the disclosed battery augmentation systems. Similarly, the disclosed battery augmentation systems can be implemented on UAV configurations other than those shown and described below. In general, the battery augmentation aspects of the disclosure are described below under headings 2.0-8.0, and further UAV configurations are described under heading 9.0.

2.0 Multi-Rotor Vehicle System

Figure 1B:
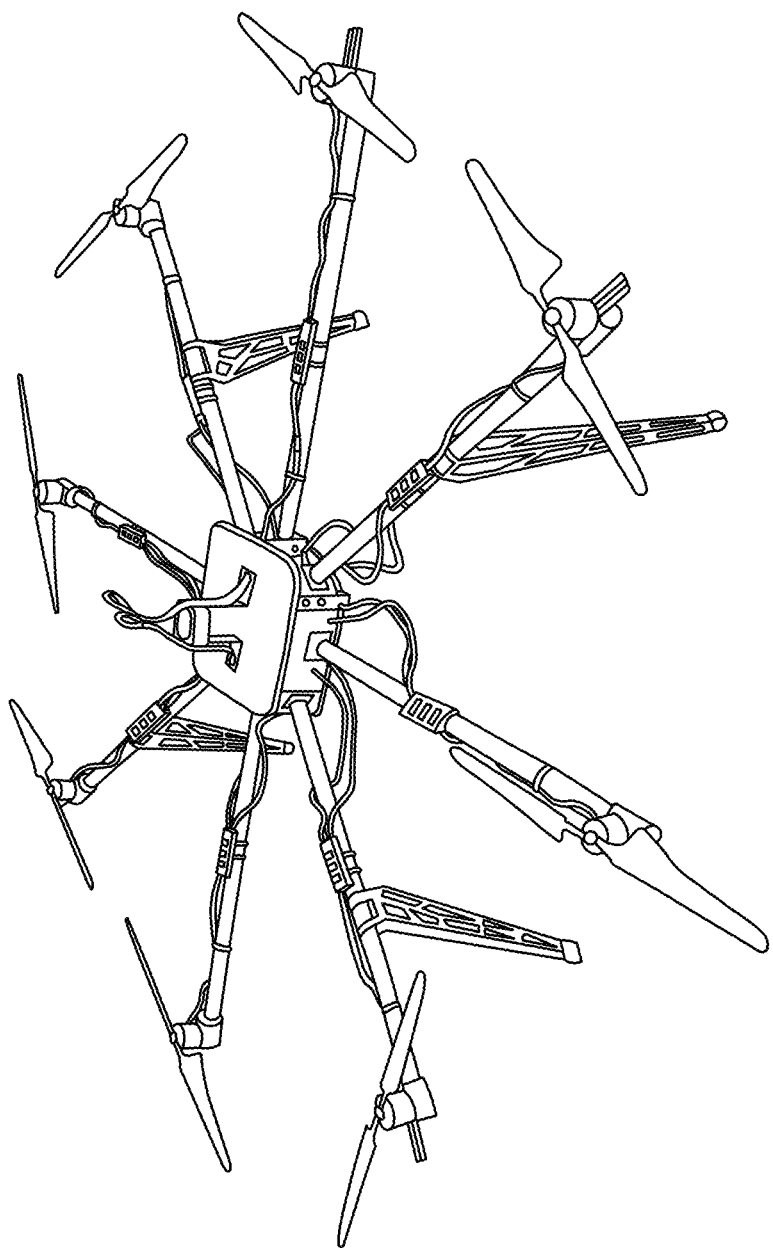
FIG. 1B is an illustration of a portion of a representative vehicle on which embodiments of the systems disclosed herein can be installed.

FIG. 1A is a block diagram of a representative system architecture of a multi-rotor vehicle 100, in accordance with at least some embodiments. A representative vehicle platform is shown in FIG. 1B. The multi-rotor vehicle, for example, can be a rotary wing vehicle utilizing eight electrically driven fixed pitch rotors. As used herein, the term "rotor" is used to include rotors, propellers and any other suitable rotating blade or blade-type structure that imparts a force to a vehicle via interaction with the surrounding fluid medium. The multi-rotor vehicle can include multiple subsystems. The subsystems can include an avionics subsystem 102, a genset subsystem 104, one or more of electronic speed controllers (ESCs) 106 (e.g., 8 controllers in a vehicle with 8 rotors), and one or more drive motors 108 that drive one or more rotors 110 (e.g., propellers). In some embodiments, a drive motor is "coupleable" to a rotor/propeller. That is, the drive motor is adapted in a structure that is capable of being coupled to the rotor/propeller.

The multi-rotor vehicle 100 can contain one or more avionics batteries 112 and one or more vehicle batteries 114. One or more (e.g., all) drive motors 108 and rotors 110 combinations can be powered by three phase alternating current (AC) electrical power, supplied by one of the dedicated electronic speed controllers (ESC) 106.

The ESCs 106 can be powered by a common direct current power bus (hereinafter, the "DC motor bus 116"). The DC motor bus 116 is powered by the genset subsystem 104, whose primary role is to convert liquid fuel into DC power via a microcontroller-managed motor-generator conversion pipeline. The genset subsystem 104 can include a microcontroller to manage the motor-generator conversion pipeline. The thrust produced by each of the ESCs 106, the drive motors 108, and the rotors 110 combination can be controlled via dedicated, unidirectional serial links that use pulse width modulation (PWM) encoded control signals, connected to the avionics subsystem 102.

FIG. 1B is an illustration of a portion of a representative vehicle, such as the multi-rotor vehicle 100, on which embodiments of the systems disclosed herein can be installed.

Figure 2:
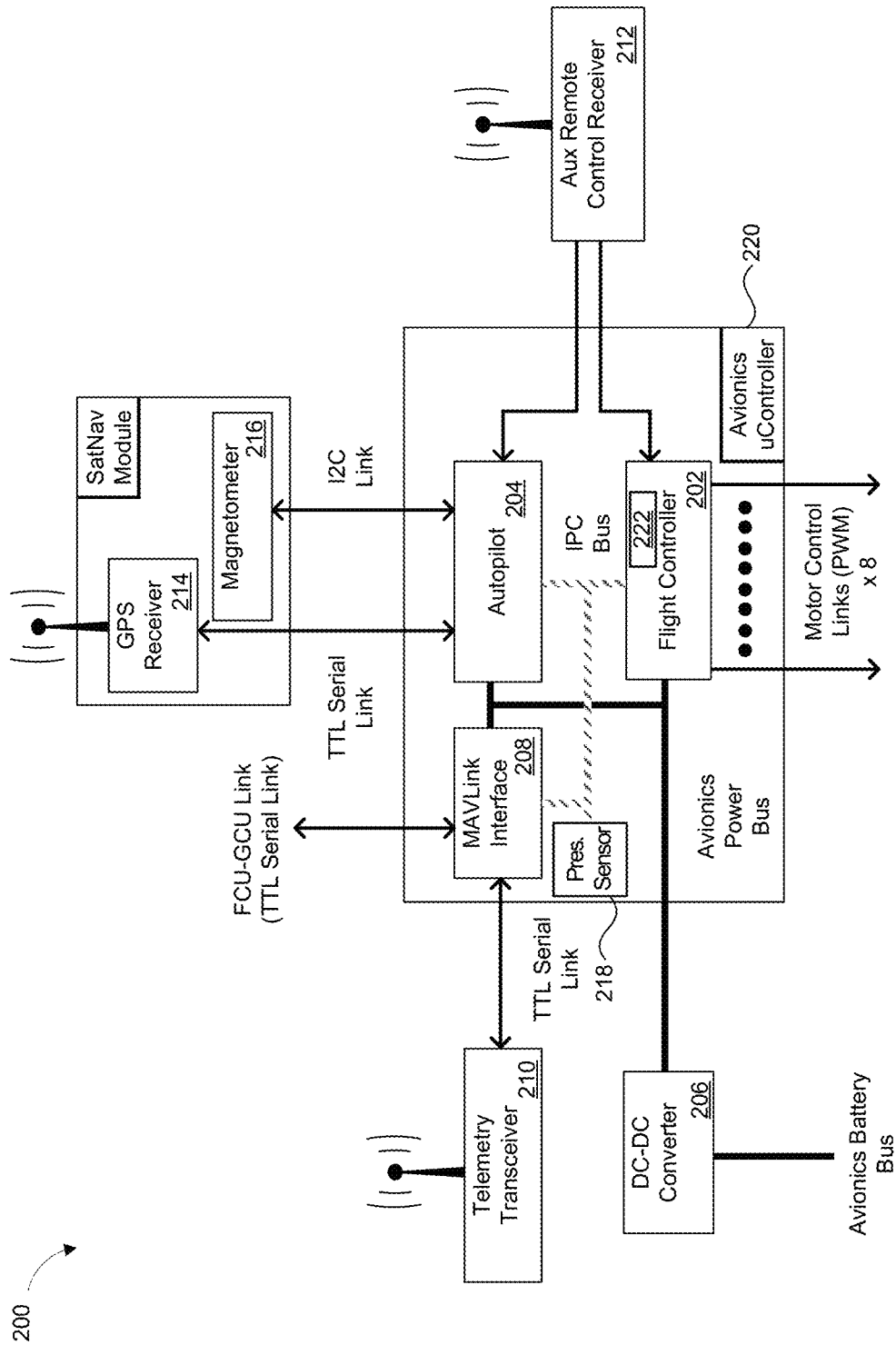
FIG. 2 is a block diagram of a representative system architecture of an avionics subsystem of a vehicle, in accordance with at least some embodiments.

FIG. 2 is a block diagram of a representative system architecture for an avionics subsystem 200 of a vehicle (e.g., the multi-rotor vehicle 100 of FIG. 1), in accordance with at least some embodiments. For example, the avionics subsystem 200 can be, or be part of, the avionics subsystem 102 of FIG. 1A.

The avionics subsystem 200 can facilitate remotely piloted flight control and/or autonomous flight control. The avionics subsystem 200 can include at least the following functional blocks: a flight controller 202, an autopilot module 204, a DC-DC Converter 206, a micro air vehicle link (MAVLink) Interface 208, a telemetry transceiver 210, an auxiliary remote control receiver 212, a global positioning system (GPS) receiver 214, a magnetometer 216, a barometric pressure sensor 218, or any combination thereof.

Most multi-rotor vehicles are neither dynamically nor statically stable, and thus require active flight stabilization. The flight controller (FC) 202 can be a module contained within the operating code of an avionics controller 220 (e.g., an avionics microcontroller). The avionics controller 220 can be connected to the vehicle ESCs, thus controlling the thrust produced by each drive motor/rotor combination and providing stabilized flight.

The flight controller 202 can use a six-axis accelerometer array 222 to ascertain the specific thrust levels that each motor/prop combination needs to produce, in order to maintain, or change, desired acceleration values over three rotational axes and three translational planes. The flight controller 202 is also capable of holding a preset vehicle orientation (i.e., maintaining zero velocity across all three axis). The flight controller 202 can either be commanded by a ground based pilot (under a Fully Manual Remotely Piloted Operation Mode), an autopilot (under an Autonomous Operation Mode), or a combination of manual commands from a ground based pilot and an autopilot-based augmentation (under a Fly-By-Wire Operation Mode). The flight controller 202 receives control information from any individual or combination of command sources depending on which mode is active and/or whether the avionics subsystem 200 is using primary or backup radio frequency (RF) control links. The command sources can include: the telemetry transceiver 210 (e.g., interfaced through the MAVLink interface 208 via interprocess communication (IPC)); the auxiliary remote control receiver 212 (e.g., PWM links); and an Inter-Process Communication (IPC) link from the autopilot module 204.

The autopilot module 204 can be contained within the operating code of the avionics controller 220. The autopilot module 204 provides at least two functions, including execution of stored flight plans during the autonomous flight operation mode and integration of GPS, barometric altimetry, and magnetometer data during the Fly-by-Wire modes operation mode.

The autopilot module 204 can be connected to both the GPS receiver 214 (e.g., via a TTL Serial Link) and the magnetometer 216 (e.g., via an I2C link). The autopilot module 204 can be connected to the barometric pressure sensor 218 via its IPC link. External to the vehicle, the autopilot module 204 can also connect with a control station via the MAVLink interface 208 (e.g., IPC-connected interface) and the telemetry link. The autopilot module 204 can further be connected to a dedicated remote handheld flight controller via PWM links through the auxiliary remote control receiver 212 (e.g., a radio receiver).

All avionics functions in the avionics subsystem 200 can be powered by the DC-DC converter 206 (e.g., a dedicated DC-DC converter). The DC-DC converter 206 is powered by one or more avionics batteries in the vehicle. Alternatively, the DC-DC converter 206 can also be powered by a genset subsystem, such as the genset subsystem 104 of FIG. 1A or the genset subsystem 300 of FIG. 3. The DC-DC converter can also receive backup power or power augmentation from the genset subsystem.

Figure 3:
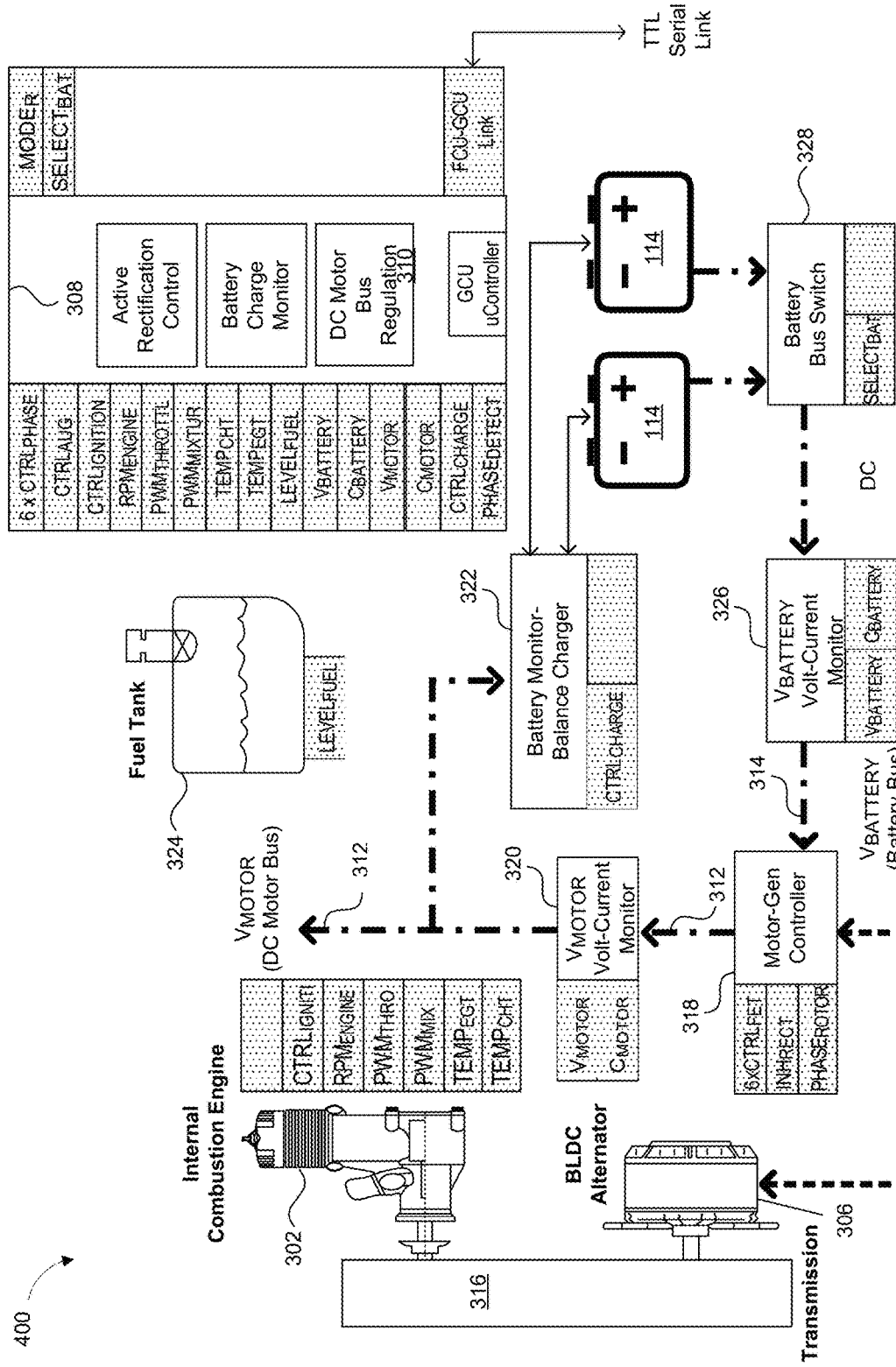
FIG. 3 is a block diagram of a representative system architecture of a genset subsystem of a vehicle, in accordance with at least some embodiments.

FIG. 3 is a block diagram of a representative system architecture of a genset subsystem 300 of a vehicle (e.g., the multi-rotor vehicle 100 of FIG. 1), in accordance with at least some embodiments. For example, the genset subsystem 300 can be the genset subsystem 104 of FIG. 1. The genset subsystem 300 implements the disclosed DC power supply system that enables battery power to augment power generated from an internal combustion engine (ICE) 302. In some embodiments, another fuel-based power source can replace the ICE 302. For example, a fuel-based power source can generate mechanical movement and couple the mechanical movement input to an alternator 306.

The genset subsystem 300 implements an energy conversion pipeline that converts liquid fuel to electrical energy through the ICE 302 and the alternator 306, such as a brushless DC alternator. The alternator 306 can have a mechanical movement input and a multiphase alternating current output. The energy conversion pipeline can have a high ratio of conversion pipeline weight to power density. This ratio is referred to as the pipeline conversion efficiency (PCE). The genset subsystem 300 can advantageously use lightweight hardware controlled by a complex power management system implemented by a microcontroller 308. The microcontroller 308 receives monitor sensor links to determine the state of the genset subsystem 300 and outputs various control links to adjust various components of the genset subsystem 300. FIG. 3 illustrates examples of the sensor links and the control links as shaded boxes. This combination enables the use of the ICE 302 by implementing a way to stabilize the DC power output of the ICE 302. The genset subsystem 300 is able to reach higher levels of PCE that are normally unreachable by conventional power management systems.

The disclosed vehicle uses the ICE 302 (e.g., a lightweight ICE) to mechanically drive the alternator 306. For example, the alternator 306 can be a multi-phase alternator (e.g., The alternator 306 through a transmission. In at least some cases, neither the ICE 302, nor the alternator 306 are necessarily well suited for powering electrically driven multi-rotor vehicles due to the ripples in the power they generate. The ICE 302 and the alternator 306 are, however, among the highest density (e.g., watt per lbs) components for converting liquid fuel to raw electrical energy.

In order to gain the benefit of these components (e.g., the very high conversion density), the disclosed vehicle implements control modules via the microcontroller 308 to carefully monitor and actively control both the ICE 302 and other components within the conversion pipeline.

The energy conversion pipeline can begin with fueling the ICE 302. The microcontroller 308 can implement a DC motor bus regulation (MBR) module 310 that controls the power output and rotational frequency (revolutions per minute (RPM)) of the ICE 302. The DC MBR module 310 can be a module implemented by the microcontroller 308 executing digital instructions stored on a persistent digital memory within or outside the microcontroller 308. The DC MBR module 310 controls the ignition, throttle and fuel/air mixture of the ICE 302. The DC MBR module 310 also monitors the current and voltages on both a DC motor bus 312 and the vehicle's battery bus 314, such as when starting up the ICE 302.

A transmission 316 can mechanically connect the ICE 302 and the alternator 306. The alternator 306 can be a multi-phase alternator having three external phase outputs that nominally create a three phase AC. Each external phase connection can be connected to multiple internal phases within the alternator 306.

This multi-phase configuration of the alternator 306 can maximize the mechanical conversion efficiency of the alternator 306 (e.g., in terms of watts per unit torque). This configuration of the alternator 306, however, can produce AC electrical power that contains a highly complex set of waveforms, along with transient inductances.

To address these potential inefficiencies, the genset subsystem 300 converts the AC power feed into a direct current (DC) power feed in the DC motor bus 312 by actively rectifying the AC signal and reducing inductance-related power conditioning deficiencies via a motor-gen controller (MGC) 318. The MGC 318 can also compensate for ripples in the converted direct-current power feed.

The genset subsystem 300 can also operate by using the alternator 306 as a starter motor for the ICE 302. In order to facilitate this mode of operation, the three AC phases of the alternator 306 are connected to the MGC 318. The MGC 318 can be actively controlled by the microcontroller 308. The MGC 318 can provide lossless rectification of the complex AC power feed into a power feed on the DC motor bus 312. The MGC 318 can also provide active and dynamic cancelation of synchronous reactance (e.g., Power Factor correction) and provide three phase power to the alternator 306 in order to drive the alternator 306 as a motor during a start sequence of the ICE 302. The MGC 318 can further enable dynamic integration of the vehicle's battery power both during periods of transient power deficits and during a complete failure of the ICE 302 or the alternator 306 (e.g., the vehicle can operate in a Battery-Only Mode, which can be commanded by ground-based operators if such operation is desired). The MGC 318 can yet further provide active mitigation of ripple in the DC output of the genset subsystem 300.

Typical passive rectifiers use a diode that imposes a forward voltage drop during rectification. This property of a passive rectifier "clips" the peak of an AC input voltage by exactly the amount of the forward voltage drop. As an example, if a single phase AC signal with a peak-to-peak voltage of 20V is introduced into a bridge rectifier (e.g., 4 diodes configured to invert the "negative" side of the AC signal), the resulting peak of the DC output would be 10V minus the voltage across the diodes used in the rectifier. For example, for a typical power diode, the forward voltage drop is 1.7V, or a 17% drop in the peak voltage in the above example. Power generally scales as the square of voltage. Hence, for example, reducing the voltage to 83% (i.e., 17% drop) reduces the power to around 69% (i.e., $0.83^2$), resulting in an approximately 31% power loss. This effect is particularly significant in low voltage AC applications (e.g., AC power generated from the alternator 306).

In embodiments where the alternator 306 generates lower voltage AC, implementation of passive rectifiers in the MGC 318 would cost a reduction in power and would create potential cooling problems in the passive rectifiers (i.e., from power dissipation associated with the voltage drop across the diodes). In these embodiments, the MGC 318 implements phase controllers to perform active rectification. In several embodiments, with active rectification, instead of using power diodes, transistors are used as diodes in each of the phase controllers to minimize forward voltage drop (e.g., see FIGS. 11 and 12). For example, the transistors can be field effect transistors (FETs) or bipolar transistors. As a specific example, the FETs can be metal oxide semiconductor field effect transistors (MOSFETs). As another specific example, the bipolar transistors can be insulated gate bipolar transistors (IGBTs) Each transistor can include a "body diode." The MGC 318 can reduce resistance and the forward voltage drop across the body diode by turning the transistor on (e.g., by applying a suitable gate voltage to the transistor). The transistors of the phase controllers enable the MGC 318 to emulate a diode-based rectifier without the power reduction. In some embodiments, diodes are still used as part of the phase controllers (e.g., see FIG. 22).

This reduction of resistance is enabled by use of the N channel in each FET to cancel the forward voltage drop of the FET's body diode (e.g., 1.7V drop). The MGC 318 turns on a respective FET's N channel (e.g., by applying suitable gate voltage to the FET) any time the body diode of the FET is conducting. The MGC 318 can detect whether the body diode is conducting in at least two ways. The MGC 318 can include a current shunt in each phase controller to sense current flow across the body diode and locally (e.g., within the phase controller). If the current flow indicates the body diode is conducting, a suitable gate voltage is applied to the respective FET to turn the FET into saturation. In other embodiments, the AC phase outputs of the alternator 306 are monitored by the microcontroller 308. The microcontroller 308 can drive the gate voltage of respective FETs into saturation based at least partly on the monitored voltage from the alternator 306 (e.g., by determining whether the monitored voltage relative to the DC motor bus 312 would cause the body diode to conduct).

Because a saturated FET can conduct current at very low power loss, the rectification process described above can be considered a "lossless rectification." This feature is advantageous because the FETs can behave like a diode with an almost immeasurably low forward voltage drop, thus avoiding power loss through the forward voltage drop.

The genset subsystem 300 can operate in different operational modes. For example, these operational modes can include an Engine Start Mode, a Generator-Only Mode, a generator with Ripple Mitigation Mode, a generator with Battery Augmentation Mode, and a Battery-Only Mode. At any time the alternator 306 is producing power, a battery charging sub mode may be activated. The battery charging sub mode can be operational together with the Generator-Only Mode, the generator with Ripple Mitigation Mode, and the generator with Battery Augmentation Mode.

Any time the alternator 306 is producing power (e.g., the Generator-Only Mode, the generator with Ripple Mitigation Mode and the generator with Battery Augmentation Mode), the MGC 318 can provide rectification of the AC power feed from the alternator 306. The MGC 318 can operate under two rectification modes as well, including an autonomous rectification mode and an assisted rectification mode.

The genset subsystem 300 can further include a motor bus monitor 320, a battery charger 322, a fuel tank 324, a battery monitor 326, and a battery bus switch 328. The motor bus monitor 320 monitors the voltage and current flow through the DC motor bus 312 for the microcontroller 308. The battery charger 322 charges and monitors the vehicle batteries 114. The fuel tank 324 stores fuel for the ICE 302. The battery monitor 326 monitors the voltage and current through the battery bus 314 for the microcontroller 308. The battery bus switch 328 connects zero or more of the vehicle batteries 114 to the battery bus 314 (zero meaning disconnecting the battery bus 314 from any battery).

Figure 4:
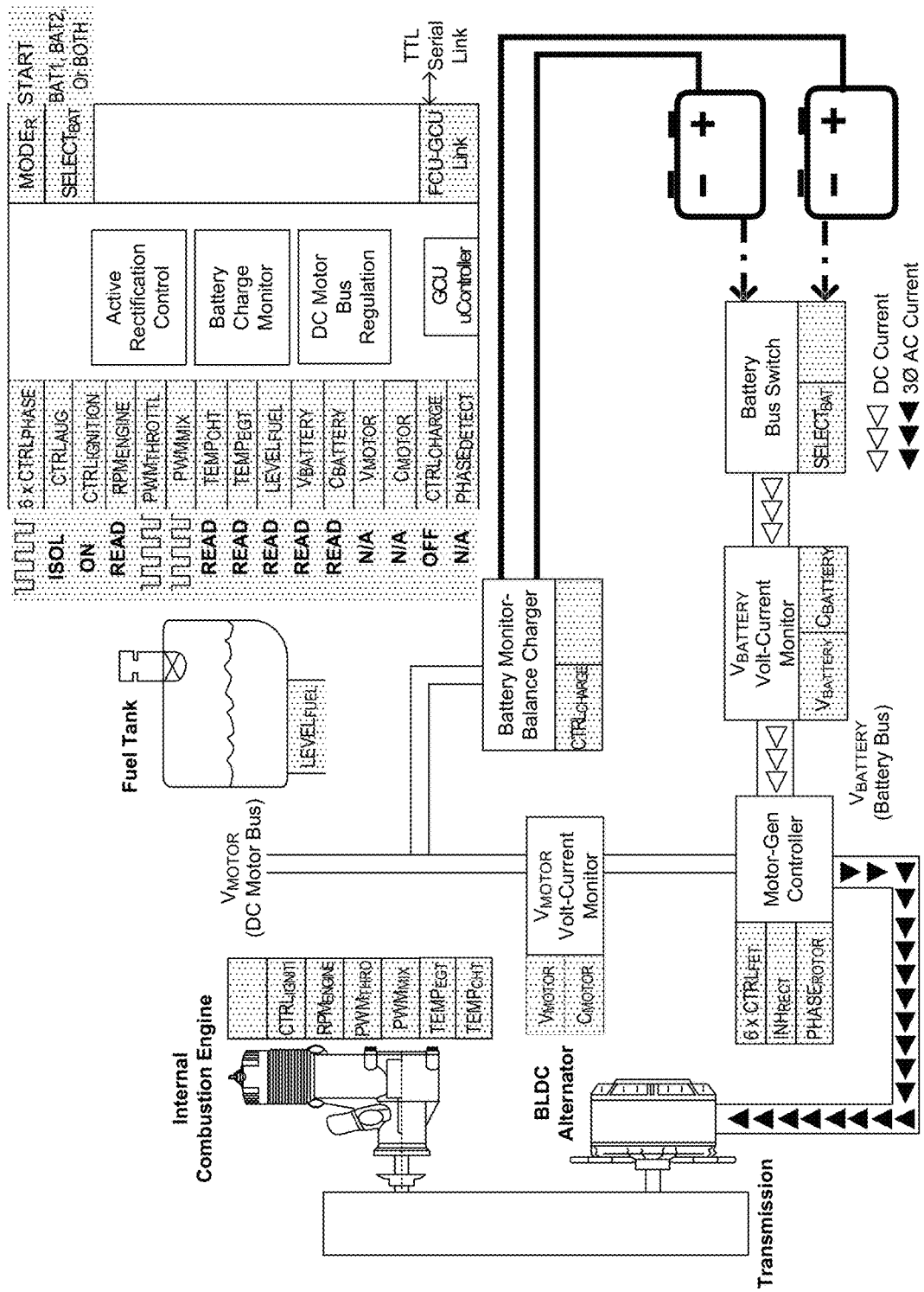
FIG. 4 is a current flow diagram within the genset subsystem of FIG. 3 in a Ground-Level Engine Start Mode, in accordance with at least some embodiments.

FIG. 4 is a diagram of current flow within the genset subsystem 300 of FIG. 3 in a Ground-Level Engine Start Mode, in accordance with at least some embodiments. In this mode, the microcontroller 308 initially monitors the battery bus 314 (labeled as "VBATTERY") and a fuel level (labeled as "LEVELFUEL") to ensure both are adequate for the ICE 302 to start.

The microcontroller 308 then commands 3 phase power (commutated DC) to be directed toward the alternator 306 via a combination of control signals (e.g., control voltage low signal and control voltage high signal, labeled as "CTRLVL", "CTRLVH", respectively) to the MGC 318. In response, the MGC 318 generates the 3 phase commutated DC power. The microcontroller 308 also controls the engine throttle of the ICE 302 and the fuel mixture of the ICE 302 via control signals (e.g., pulse width modulated signals) to the ICE 302 (labeled as "PWMTHROTTLE" and "PWMMIXTURE" respectively).

Sensor signals can be fed back to the microcontroller 308. For example, engine rotational speed (e.g., RPM, labeled as "RPMENGINE"), exhaust gas temperature (labeled as "TEMPEGT"), cylinder head temperature (labeled as "TEMPCHT"), and battery bus current (to label as "CBATTERY") can be monitored by the microcontroller 308. The battery charge can be used as a proxy for startup torque of the ICE 302. The sensor signals can close the feedback loop for the ICE 302 startup sequence.

Figure 5:
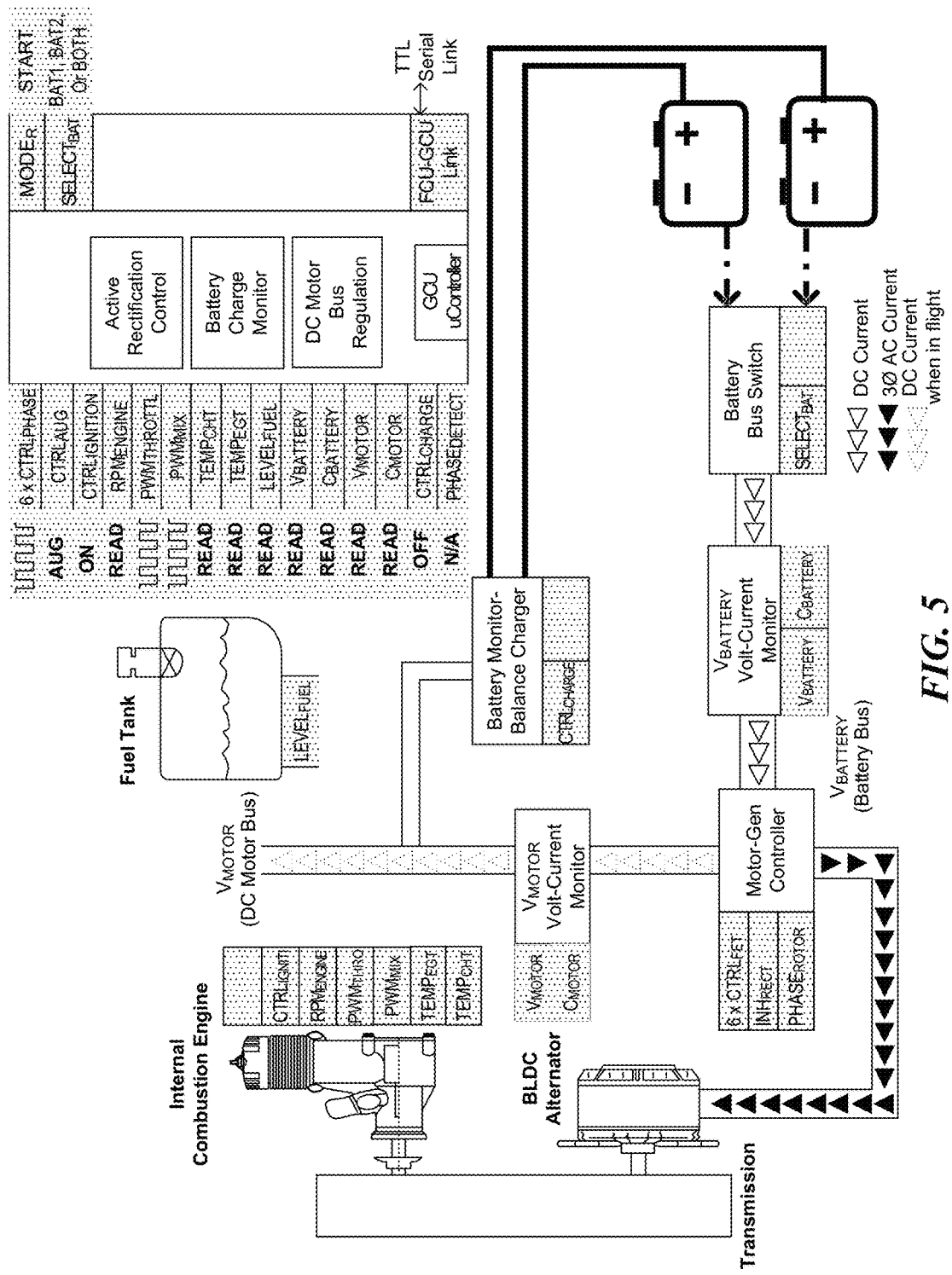
FIG. 5 is a current flow diagram within the genset subsystem of FIG. 3 in an Inflight Engine Start Mode, in accordance with at least some embodiments.

The ICE 302 can be started while the vehicle is on the ground, as well as while the vehicle is in flight. FIG. 4 depicts a current flow state of the genset subsystem 300 when starting the ICE 302 on the ground. One or more of the vehicle batteries (e.g., the vehicle batteries 114) can be utilized in this mode. FIG. 5 is a diagram of current flow within the genset subsystem 300 of FIG. 3 in an Inflight Engine Start Mode, in accordance with at least some embodiments. In this mode, the DC motor bus 312 is energized by the MGC 318 (e.g., an augmentation controller of the MGC 318). The DC motor bus 312 delivers power and thus enables the vehicle's drive motors (e.g., the drive motors 108) to propel the vehicle. The MGC 318 at the same time can commutate power to the alternator 306 so that the alternator 306 can start the ICE 302. For example, phase controllers that are used for rectifying AC power from the alternator 306 in other modes can now be used to communicate power to the alternator 306.

3.0 Genset System Operational Modes
3.1 Generator-Only Mode

Figure 6:
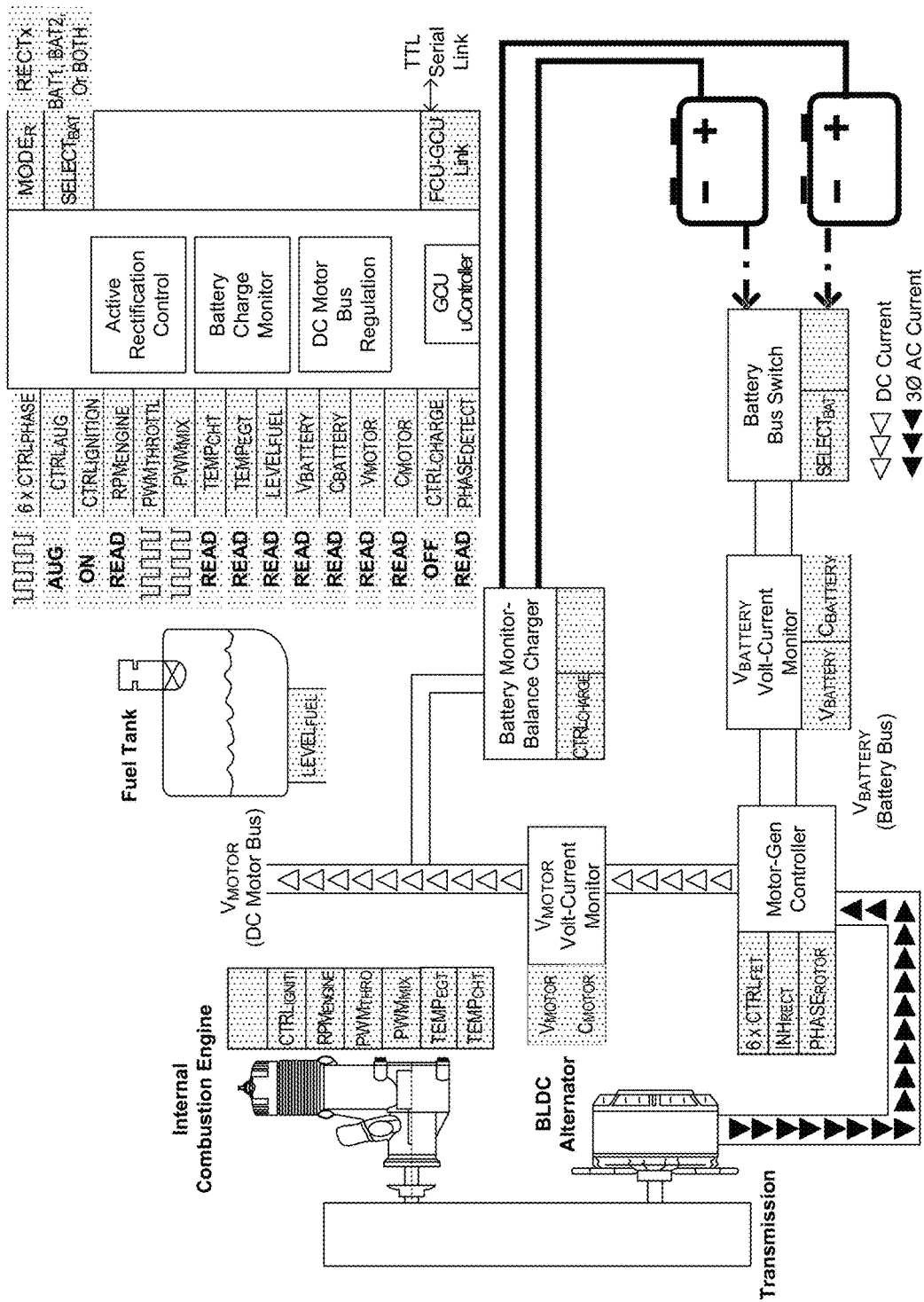
FIG. 6 is a current flow diagram within the genset subsystem of FIG. 3 in a Generator-Only Mode, in accordance with at least some embodiments.

FIG. 6 is a diagram of current flow within the genset subsystem 300 of FIG. 3 in a Generator-Only Mode, in accordance with at least some embodiments. In the Generator-Only Mode, all motive power for the vehicle is supplied by the alternator 306. In this mode, the microcontroller 308 can actively manage both ICE 302's torque production, as well as the various power conditioning functions of the MGC 318.

The microcontroller 308 monitors voltage at the DC motor bus 312 (via a sensor link labeled "VMOTOR"). The microcontroller 308 can also manage ICE 302's torque output (via a controller link labeled "PWMTHROTTLE"). The microcontroller 308 also manages the efficiency of the ICE 302 by optimizing mixture by monitoring the exhaust gas temperature (via the sensor link labeled "TEMPEGT") as a combustion efficiency feedback loop. Rectification of the AC power provided through the alternator 306 is provided by the MGC 318, either via autonomous or assisted modes.

Figure 7:
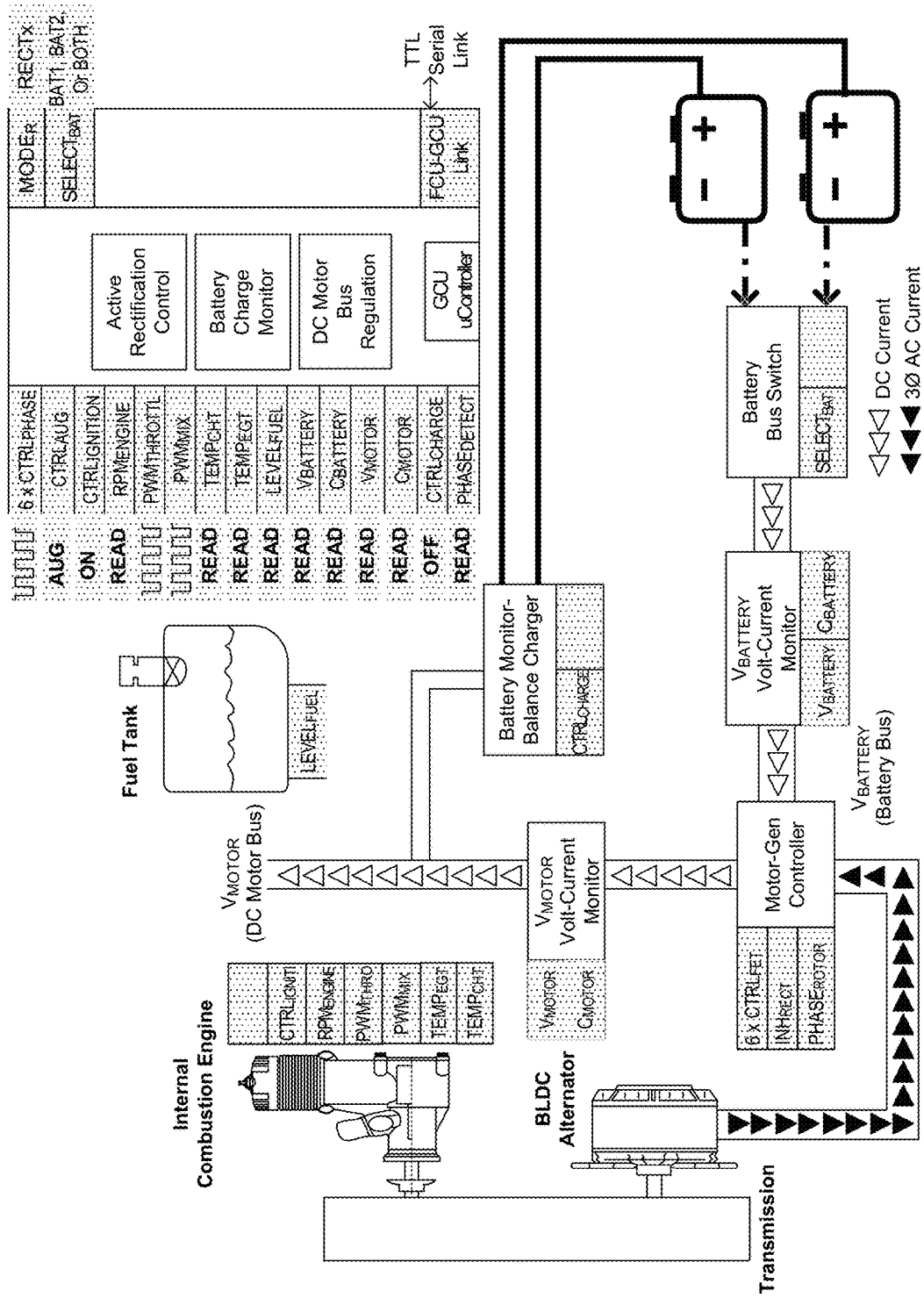
FIG. 7 is a current flow diagram within the genset subsystem of FIG. 3 in a Ripple Mitigation Mode or a Battery Augmentation Mode, in accordance with at least some embodiments.

FIG. 7 is a current flow diagram within the genset subsystem 300 of FIG. 3 in a Ripple Mitigation Mode or a Battery Augmentation Mode, in at least some embodiments.

3.2 Generator with Ripple Mitigation Mode

Operation in the Ripple Mitigation Mode can be identical to the Generator-Only Mode, with the exception that the one or more of the vehicles' batteries are used by the MGC 318 to remove ripple from the rectified output power, prior to output to the DC motor bus 312. In some embodiments, the augmentation controller is configurable to prevent the direct current from the DC motor bus 312 from flowing into the battery bus 314, and to allow current to flow from the battery bus 314 to the DC motor bus 312 when a first voltage of the DC motor bus 312 falls below a second voltage of the battery bus 314.

One feature of this operating mode is the combination of the augmentation controller's functionality within the MGC 318, and the microcontroller 308's regulation of the output of the alternator 306. In the Ripple Mitigation Mode, the microcontroller 308 monitors the nominal voltage on the battery bus 314 and utilizes that to control the throttle of the ICE 302. Via the throttle control of the ICE 302, the microcontroller 308 can ensure that the peak voltage of the DC ripple from the rectification process (e.g., via phase controllers in the MGC 318) matches the nominal bus voltage of the battery bus 314. For example, the augmentation controller is configurable to provide that the alternator produces less voltage than a nominal voltage of a battery in the battery set.

As a result, during transient troughs in DC ripple in the output of the rectification process, the augmentation controller connects the battery bus 314 to the DC motor bus 312. This connection effectively "fills in" the troughs in the DC output with power from the battery bus 314, and creates a substantially ripple-free output from the MGC 318 to the DC motor bus 312.

A control link labeled "SELECTBAT" allows the microcontroller 308 to select which of the vehicle batteries should be used in this mode. The microcontroller 308 can select one or more of the vehicle batteries. For example, the microcontroller 308 can use one battery for ripple mitigation and charge another battery with the DC power from the DC motor bus 312.

3.3 Generator with Battery Augmentation Mode

Operation in this mode can be identical to the Generator-Only Mode, with the exception that the one or more of the vehicle batteries 114 are used by the MGC 318 to augment the power supplied by the alternator 306. There are two augmentation sub modes when operating under this mode including an automated augmentation and a selected augmentation.

3.3A Automated Augmentation Sub Mode

This sub mode is used when the vehicle requires more power than the alternator 306 can provide. This sub mode can either be triggered by a catastrophic failure of some component in the ICE 302, the transmission 316, or the alternator 306, or a momentary power deficit due to unusual/extreme flight conditions. This sub mode can also be commanded from the microcontroller 308. In some embodiments, when in this sub mode, the ICE 302's throttle is at a maximum, and the augmentation controller mediates transfer of power from the battery bus 314 to the DC motor bus 312, thus augmenting the power output of the alternator 306 with battery power.

The augmentation controller can accomplish this mediation by utilizing the voltage differential between the DC motor bus 312 and the battery bus 314 to regulate augmentation from the battery, such that as much of the power from the alternator 306 as possible is used by the vehicle's drive motors (e.g., the drive motors 108), and thus the ship's battery usage is limited only to that which is needed beyond the maximum power provided by the alternator 306.

In particular embodiments, whenever the voltage on the DC motor bus 312 (e.g., the root mean square (RMS) voltage produced by the alternator 306 and the rectification process) falls below that of the battery bus 314, the augmentation controller directs power from the battery bus 314 to the DC motor bus 312. Conversely, as the system load decreases such that the RMS voltage produced by the alternator 306 and rectification process rises above that of the battery bus 314, the augmentation controller ceases augmenting power on the DC motor bus 312.

3.3B Selected Augmentation Sub Mode

This sub mode allows the microcontroller 308 to command one or more of the vehicle batteries 114 to contribute a set amount of current to the DC motor bus 312. This sub mode can be used to reduce the power load on the ICE 302 when one or more of the ICE 302's thermal limits have been reached (e.g., the exhaust gas temperature limit or the cylinder head temperature limit).

This sub mode combines the augmentation controller's functionality and the microcontroller 308's regulation of voltage output from the alternator 306 into the rectification process. When operating in this sub mode, the microcontroller 308 manages the throttle control of the ICE 302, e.g., ensuring the measured current from the battery bus 314 (via a sensor link labeled "CBATTERY") remains at a set current contribution level.

If "CBATTERY" falls below the selected set point, the ICE 302's throttle is reduced, thus reducing the torque to the alternator 306. In turn, the RMS voltage of the output from the rectification process to the augmentation controller is also reduced. This reduction increases the voltage imbalance between the DC motor bus 312 and battery bus 314, eventually causing the voltage at the DC motor bus 312 to fall relative to the voltage at the battery bus 314. The falling of the voltage at the DC motor bus 312 causes an increase to the current contribution from the battery bus 314 through the augmentation controller to the DC motor bus 312.

Conversely, if "CBATTERY" rises above the selected set point, the ICE 302's throttle is increased, thus increasing the RMS voltage of the output from the rectification process in the MGC 318 to the augmentation controller. This increases the voltage imbalance between the DC motor bus 312 and the battery bus 314, causing the DC motor bus 312 to rise relative to the battery bus 314. This rise thus decreases the current contribution from the battery bus 314 through the augmentation controller to the DC motor bus 312.

3.4 Battery-Only Sub-Mode

Figure 8:
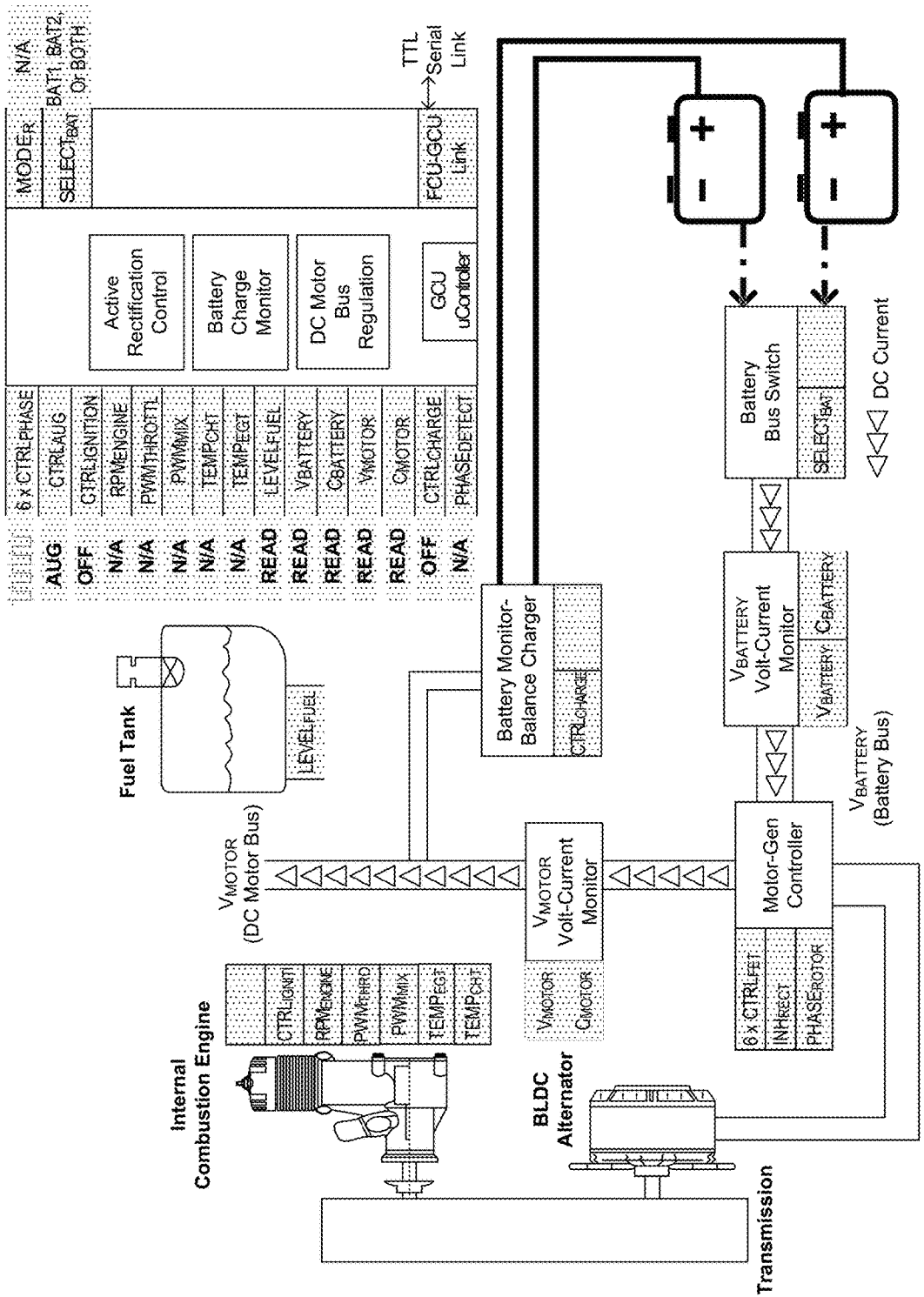
FIG. 8 is a current flow diagram within the genset subsystem of FIG. 3 in a Battery-Only Mode, in accordance with at least some embodiments.

FIG. 8 is a diagram of the current flow within the genset subsystem of FIG. 3 in a Battery-Only Mode, in accordance with at least some embodiments. This mode can be considered a special case of the Automated Augmentation sub mode described above, used when no power is available from the alternator 306. This mode can either be triggered by a failure of a component in the ICE 302, the transmission 316, or the alternator 306, or via command from the microcontroller 308.

As with the Automated Augmentation sub mode, when in the Battery-Only Mode, the augmentation controller connects the battery bus 314 to the DC motor bus 312. This ensures that the battery bus 314 provides all the power required by the DC motor bus 312 to drive the drive motors (e.g., the drive motors 108).

3.5 Battery-Charging Sub-Mode

Figure 9:
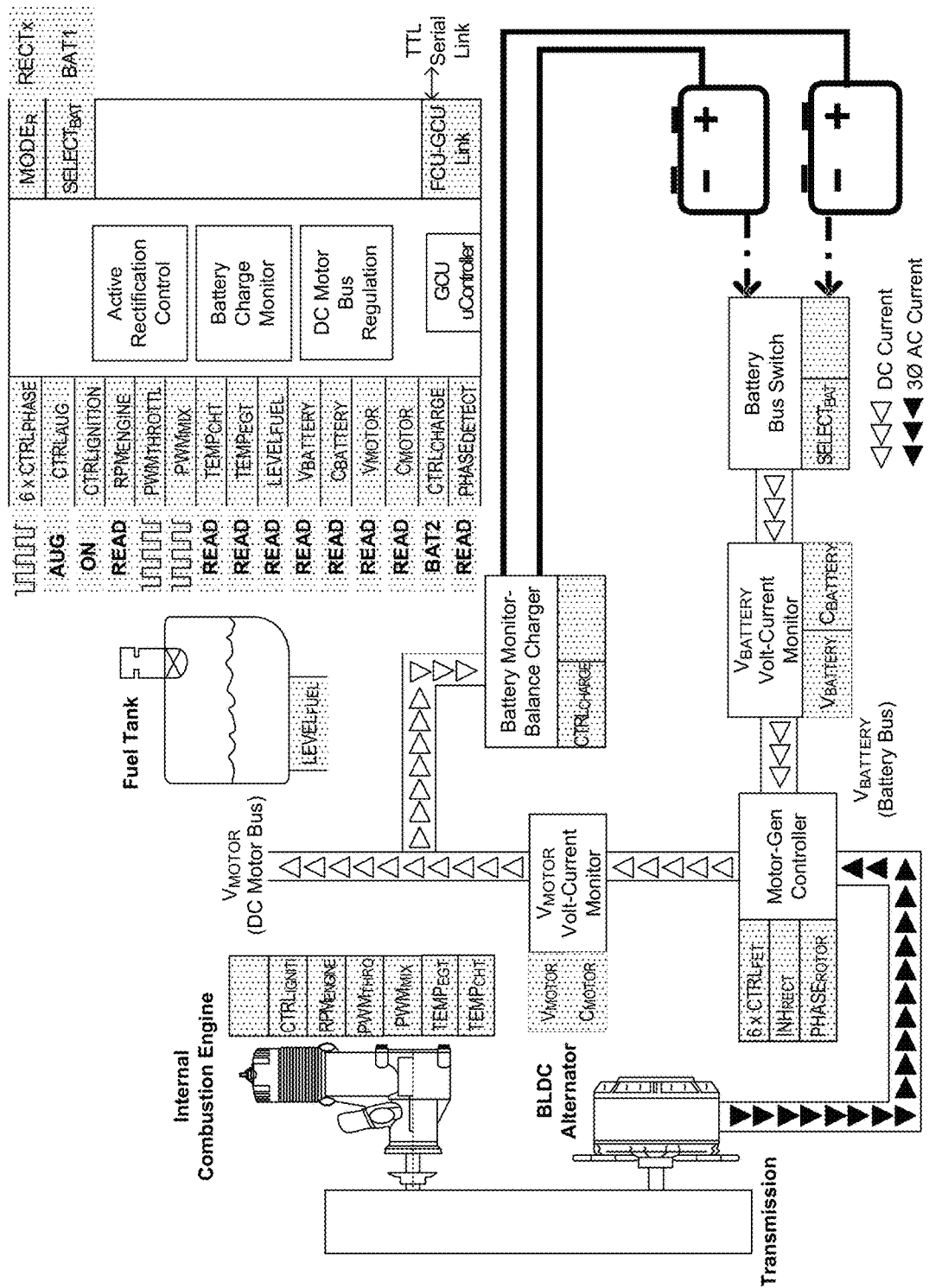
FIG. 9 is a current flow diagram within the genset subsystem of FIG. 3 in a Battery Charging Sub Mode, in accordance with at least some embodiments.

FIG. 9 is a diagram of the current flow within the genset subsystem of FIG. 3 in a battery charging sub mode, in accordance with at least some embodiments. In a particular embodiment, any time the alternator 306 is producing power, one or more of the vehicle batteries 114 can be charged. When all of the vehicle batteries 114 are being charged, none of the battery-augmented modes are available (e.g., the Ripple Mitigation Mode or the Battery Augmentation Mode).

If only a subset of the vehicle batteries 114 are being charged, then one or more other batteries can be used to enable any of the battery-augmented modes, and thus ensuring adequate battery charge levels can be maintained. This enables battery charging to occur even during periods when ripple suppression or battery augmentation are necessary or beneficial. FIG. 9 depicts only one of many battery charging mode permutations available with the genset subsystem 300. In this example, a first battery is being used for one of the battery-augmented modes, and a second battery is being charged.

Figure 10:
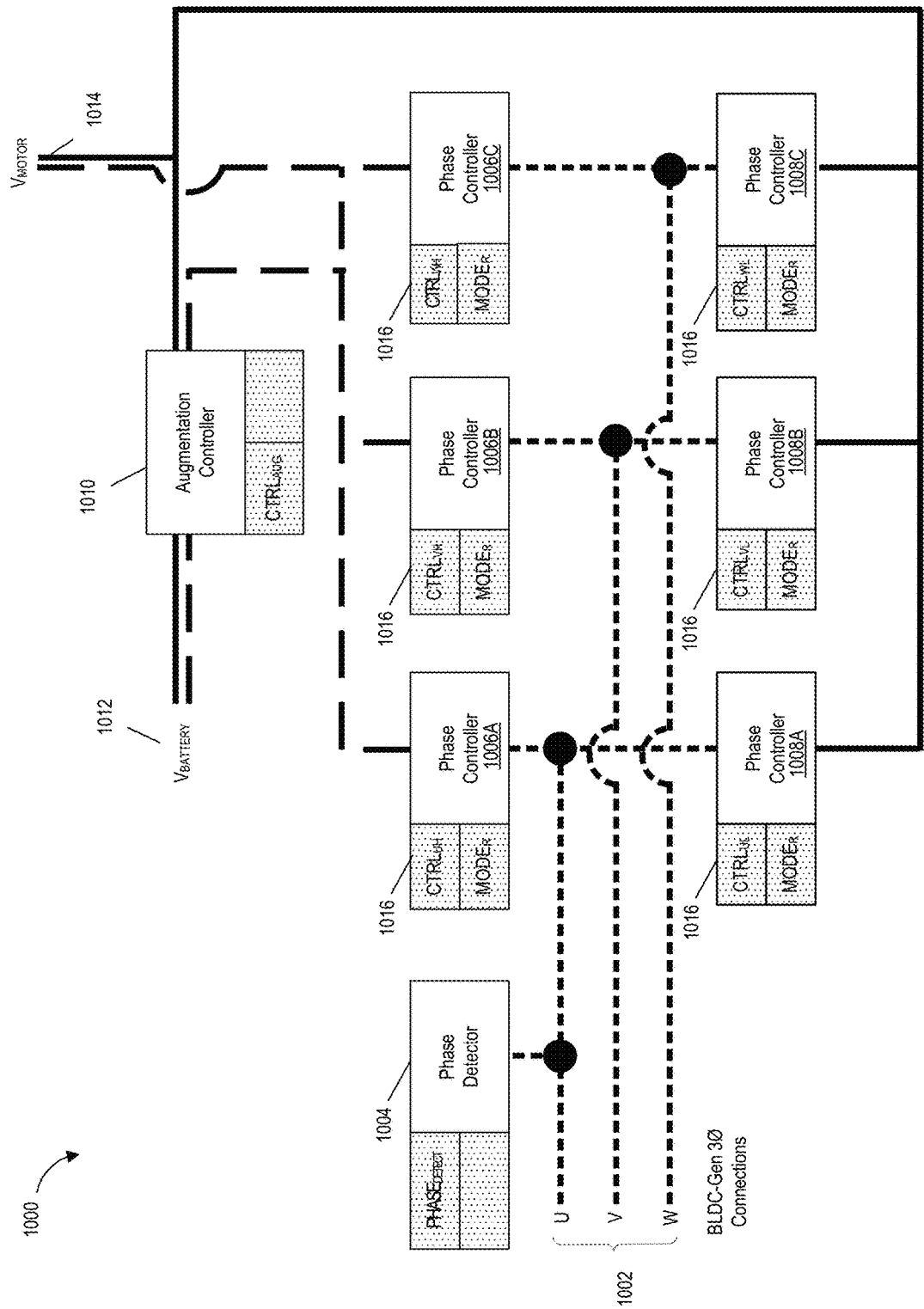
FIG. 10 is a block diagram of a representative system architecture of a motor-gen controller in a genset subsystem of a vehicle, in accordance with at least some embodiments.

FIG. 10 is a block diagram of a representative system architecture of a motor-gen controller (MGC) 1000 in a genset subsystem of a vehicle, in at least some embodiments. For example, the motor-gen controller 1000 can be the MGC 318 in the genset subsystem 300.

The MGC 1000 provides a direct linkage within the genset subsystem between alternator phases 1002 of an alternator (e.g., the alternator 306 of FIG. 3) and either or both a DC motor bus 1014 (labeled as "$V_{MOTOR}$") and the vehicle's battery bus 1012 (labeled as "$V_{BATTERY}$"). The alternator phases 1002 can act as either input or output from the alternator, depending on the operation mode of the genset subsystem.

The MGC 1000 includes at least a phase detector 1004 coupled to one of the alternator phases 1002. The phase detector 1004 can transmit a sensor link labeled "$PHASE_{DETECT}$" back to a microcontroller of the genset subsystem (e.g., the microcontroller 308 of FIG. 3). The sensor link can report the progression of the AC phases to or from the alternator. For example, because the phase difference between the alternator phases 1002 is constant, determining the AC phase of one of the alternator phases 1002 enables the microcontroller to determine others of the alternator phases 1002 at any given time. The phase detector 1004 provides the microcontroller with an angular reference point for the alternator's rotor.

The MGC 1000 also has several phase controllers coupled to the alternator phases 1002, such as two phase controllers per phase. For a three phase alternator, the MGC 1000 can include six phase controllers, including high-side phase controllers (e.g., phase controllers 1006a, 1006b, and 1006c, collectively referred to as "high-side phase controllers 1006") and low-side phase controllers (e.g., phase controllers 1008a, 1008b, and 1008c, collectively referred to as "low-side phase controllers 1008").

The DC motor bus 1014 and the battery bus 1012 can each have a higher voltage line and a lower voltage line. Each of the high-side phase controllers 1006 can be coupled to the higher voltage line of the DC motor bus 1014 and the low-side phase controllers 1008 can be coupled to the lower voltage line of the DC motor bus 1014. An augmentation controller 1010 can be coupled to the battery bus 1012 on one side and the DC motor bus 1014 on the other, enabling some DC current to flow from the battery bus 1012 to the DC motor bus 1014 in some operational modes of the MGC 1000 and/or the genset subsystem.

In the illustrated example, there are a total of six phase controllers in the MGC 1000. Each alternator phase (e.g., labeled as "U", "V", and "W") is wired into a pair of phase controllers. Each of these alternator phases 1002 has a phase controller (e.g., one of the high-side phase controllers 1006) connected to the positive side of the DC motor bus 1014, and a phase controller (e.g., one of the low-side phase controllers 1008) connected to the ground of the DC motor bus 1014.

In a particular embodiment, any time the alternator 306 is producing power, the genset subsystem 300 provides rectification of that power, thus providing DC power to the vehicle. All six of the phase controllers 1006 and 1008 can operate together in at least one of three modes: Engine Start Mode, Autonomous Rectification Mode, and Assisted Rectification Mode. The microcontroller of the genset subsystem can instruct the phase controllers in specific operational modes via control links (e.g., labeled as "$MODE_R$" in FIG. 10).

3.6 Engine Start Mode

In the Engine Start Mode, each of the phase controllers 1006 and 1008 acts as a high speed and low impedance switch, enabling current flow from its respective side of the DC motor bus 1014 to its respective alternator phase. Switching is controlled by the microcontroller of the genset subsystem, via individual control lines 1016 (e.g., one for each of the phase controllers 1006 and 1008, labeled as "$CTRL_{UH}$", "$CTRL_{UL}$", "$CTRL_{VH}$", "$CTRL_{VL}$", "$CTRL_{WH}$", and "$CTRL_{WL}$").

The control lines allow the microcontroller of the genset subsystem to connect either ground or positive to any of the alternator phases 1002. Through this, the phase controllers 1006 and 1008 provide commutated power to the alternator during the Engine Start Mode.

4.0 Phase Controller Rectification Modes 4.1 Autonomous Rectification

The Autonomous Rectification Mode of the phase controllers 1006 and 1008 enables rectification of AC power from the alternator (e.g., the alternator 306) without external control processes. In this mode, each of the phase controllers 1006 and 1008 behave like a diode with a very low (e.g., below 1 mV) forward voltage drop. As a result, the six phase controllers 1006 and 1008 can behave similar or identical to a 3 phase bridge rectifier, except without any meaningful voltage drop.

Like diodes, the high-side phase controllers 1006 connect to respective alternator phases 1002 to the positive side of the DC motor bus 1014 when the high-side phase controllers 1006 sense a positive slope zero crossing on their respective alternator phases 1002. In similar fashion, the low-side phase controllers 1008 connect to respective alternator phases 1002 to the ground side of the DC motor bus 1014 when the low-side phase controllers 1008 sense a negative slope zero crossing on their respective alternator phases 1002.

4.2 Assisted Rectification

This rectification mode is used when the alternator characteristics and the system load create synchronous reactance (e.g., phase differences between the voltage and current consumed by the electronic speed controllers of the vehicle, such as the ESCs 106 of FIG. 1) that exceeds the electronic speed controllers' capacity for compensation. That is, the microcontroller instructs the phases controllers 1006 and 1008 to perform assisted rectification when the power factor of the combined load falls too far below unity.

In this mode, each of the phase controllers 1006 and 1008 act as a high speed and low impedance switch, enabling current flow from its respective alternator phase to its respective side of the DC motor bus 1014. Switching is controlled by the microcontroller of the genset subsystem via the individual control lines 1016. The microcontroller can use the phase indication from the phase detector 1004 during assisted rectification to determine the timing of all phase controller switching.

Once the microcontroller determines the timing of the phase controller switching, the microcontroller can provide both exact "zero crossing" based switching. This type of switch can provide the same rectification properties as in the Autonomous Rectification Mode. The microcontroller can also implement "off axis" switching (e.g., in advance of zero crossing). The microcontroller implements the "off axis" switching during power factor correction modes.

The microcontroller can selectively switch some of the phase controllers 1006 and 1008 prior to zero crossing, in order to disconnect the alternator phases 1002 during periods of transient induction (e.g., what happens with Wye-connected alternator architectures during the latter part of each power cycle). By disconnecting a phase prior to induction being exhibited in the phase, the net inductance of the phase is reduced. This type of switching increases the power factor of the phase and thus reduces the induced voltage and current phase delta.

5.0 Augmentation Controller Modes

The augmentation controller 1010 can operate in at least 3 modes, including Engine Start Mode, Assisted Augmentation Mode and Isolation Mode.

5.1 Engine Start Mode

In this mode, the augmentation controller 1010 connects the DC motor bus 1014 directly to the battery bus 1012 enabling battery power to flow through the various phase controllers 1006 and 1008 to the alternator (e.g., through the alternator phases 1002) during engine start.

5.2 Assisted Augmentation

In this mode, the augmentation controller 1010 behaves like a diode with a very low (e.g., below 1 mV) forward voltage drop, allowing current to flow from the battery bus 1012 to the DC motor bus 1014 whenever the voltage on the DC motor bus 1014 drops below the battery bus 1012 voltage.

The microcontroller can select the assisted augmentation mode for the augmentation controller 1010 when the genset subsystem is in the Ripple Mitigation Mode and in the Battery Augmentation Mode (e.g., including applicable sub modes). In these genset subsystem modes, the microcontroller can modulate the RMS voltage output of the alternator (e.g., by controlling the ICE in the genset subsystem) as its primary control mechanism for these augmentation modes. For example, the microcontroller can modulate the RMS voltage output by controlling the throttling of the internal combustion engine coupled to the alternator.

The microcontroller can also put the augmentation controller 1010 in the Assisted Augmentation Mode when the genset subsystem is in the Generator-Only Mode. This enables fully autonomous battery backup in the event of sudden loss of power output from the alternator (e.g., ICE failure, transmission failure, etc.).

5.3 Isolation Mode

In this mode, the battery bus 1012 and the DC motor bus 1014 are completely isolated from each other. This mode would only be used in the event of a battery bus fault (e.g., failure of the battery bus 1012, one or more of the batteries, or the battery switch). The Isolation Mode disables the automatic battery backup function provided by the Assisted Augmentation mode and leaves the vehicle vulnerable to a loss-of-power event.

6.0 Example of Transistor-Based Phase Controllers

Figure 11:
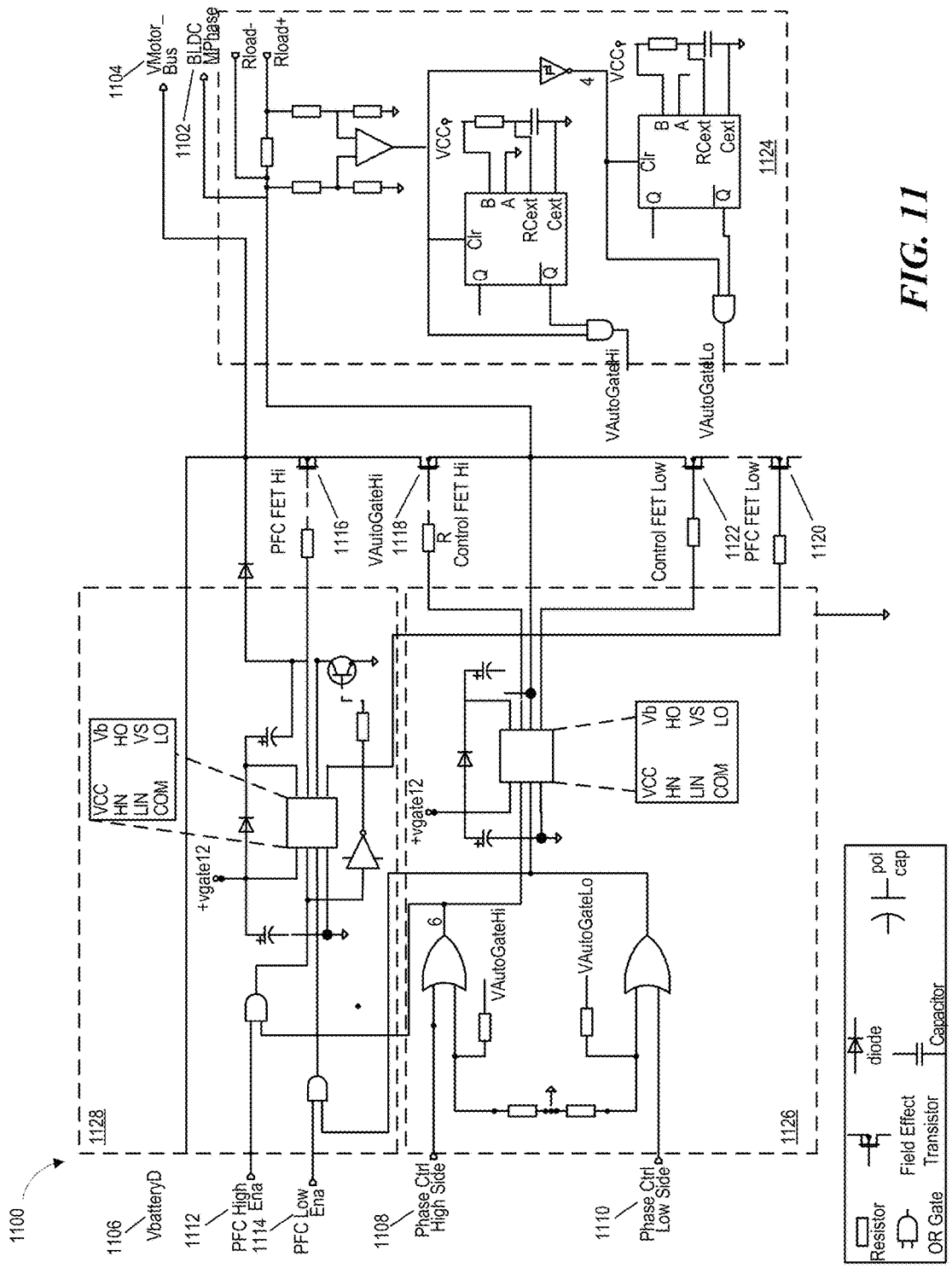
FIG. 11 is a first exemplary circuit diagram of phase controllers within a motor-gen controller in a genset subsystem of a vehicle, in accordance with at least some embodiments.

FIG. 11 is a first representative circuit diagram of phase controllers 1100 within a motor-gen controller in a genset subsystem of a vehicle, in at least some embodiments. For example, the motor-gen controller can be the MGC 318 in the genset subsystem 300 of FIG. 3. The motor-gen controller can include a microcontroller 308 of FIG. 3. The illustrated pair of the phase controllers 1100 include a high-side phase controller and a low-side phase controller.

The phase controllers 1100 is coupled to an alternator phase 1102 labeled "BLDC MPhase," a DC motor bus 1104 labeled "VMotor_Bus," a battery bus 1106 labeled "VbatteryD." The alternator phase 1102 is a bi-directional connection to one of the phases from the alternator. The alternator phase 1102 can be one of the alternator phases 1002 of FIG. 10. The DC motor bus 1104 can be the DC motor bus 312 of FIG. 3 or the DC motor bus 1014 of FIG. 10. The battery bus 1106 can be the battery bus 314 of FIG. 3 or the battery bus 1012 of FIG. 10.

The phase controllers 1100 are further connected to control links from the microprocessor of the genset subsystem. For example, the phase controllers 1100 can receive inputs from the microcontroller including a high-side phase control link 1108, a low-side phase control link 1110, a high-side power factor correction (PFC) enable link 1112, and a low-side PFC enable link 1114.

The phase controllers 1100 includes two pairs of current switches, such as field effect transistors, corresponding to a high-side phase controller and a low-side phase controller. For example, a high-side PFC switch 1116 and a high-side control switch 1118 correspond to the high-side phase controller and a low-side PFC switch 1120 and a low-side control switch 1122 correspond to the low-side phase controller.

As described above, the phase controllers 1100 can operate in an Autonomous Rectification Mode and Assisted Rectification Mode. In the Autonomous Ratification Mode, the microcontroller can keep the high-side PFC switch 1116 and the low-side PFC switch 1120 turned on. In the Assisted rectification Mode, the microcontroller can turn on and off the high-side PFC switch 1116 and the high-side control switch 1118 at the same time and turn on and off the low-side PFC switch 1120 and the low-side control switch 1122 at the same time.

6.1 Autonomous Rectification Mode for the Transistor-based Phase Controllers

The phase controllers 1100 include a current detection circuit 1124 coupled to the alternator phase 1102. The current detection circuit 1124 determines either if a body diode of the high-side control switch 1118 is flowing or if a body diode of the low-side control switch 1122 is flowing and indicates which body diode is flowing through voltage terminals labeled "VGateAutoHi" and "VGateAutoLo".

A gate control circuit 1126 receives such an indication from the current detection circuit 1124. If the body diode of the high-side control switch 1118, then higher voltage is applied to a gate of the high-side control switch 1118. If the body diode of the low-side control switch 1122, then higher voltage is applied to a gate of the low-side control switch 1122.

6.2 Assisted Rectification Mode for the Transistor-based Phase Controllers

Assisted Rectification Mode is enabled by a PFC driver circuit 1128. The PFC driver circuit 1128 is driven by the high-side PFC enable link 1112 and the low-side PFC enable link 1114. These control links allow the microcontroller to disconnect the alternator phase 1102 during periods of transient induction as determined by the microcontroller. By disconnecting the alternator phase 1102 prior to induction being exhibited, the net inductance of the alternator phase is reduced.

6.3 Engine Start Mode for the Transistor-based Phase Controllers

As described in FIG. 10, the battery bus 1106 is connected to the phase controllers 1100 and supplies current to the phase controllers 1100 when the genset subsystem is in Engine Start Mode. In this mode, the microcontroller manipulates the various phase control lines, such that each pair of the phase controllers 1100 sends commuted DC power to each of the three phases of the alternator. This enables the pairs of the phase controllers 1100 to run the alternator as a BLDC motor.

Figure 12:
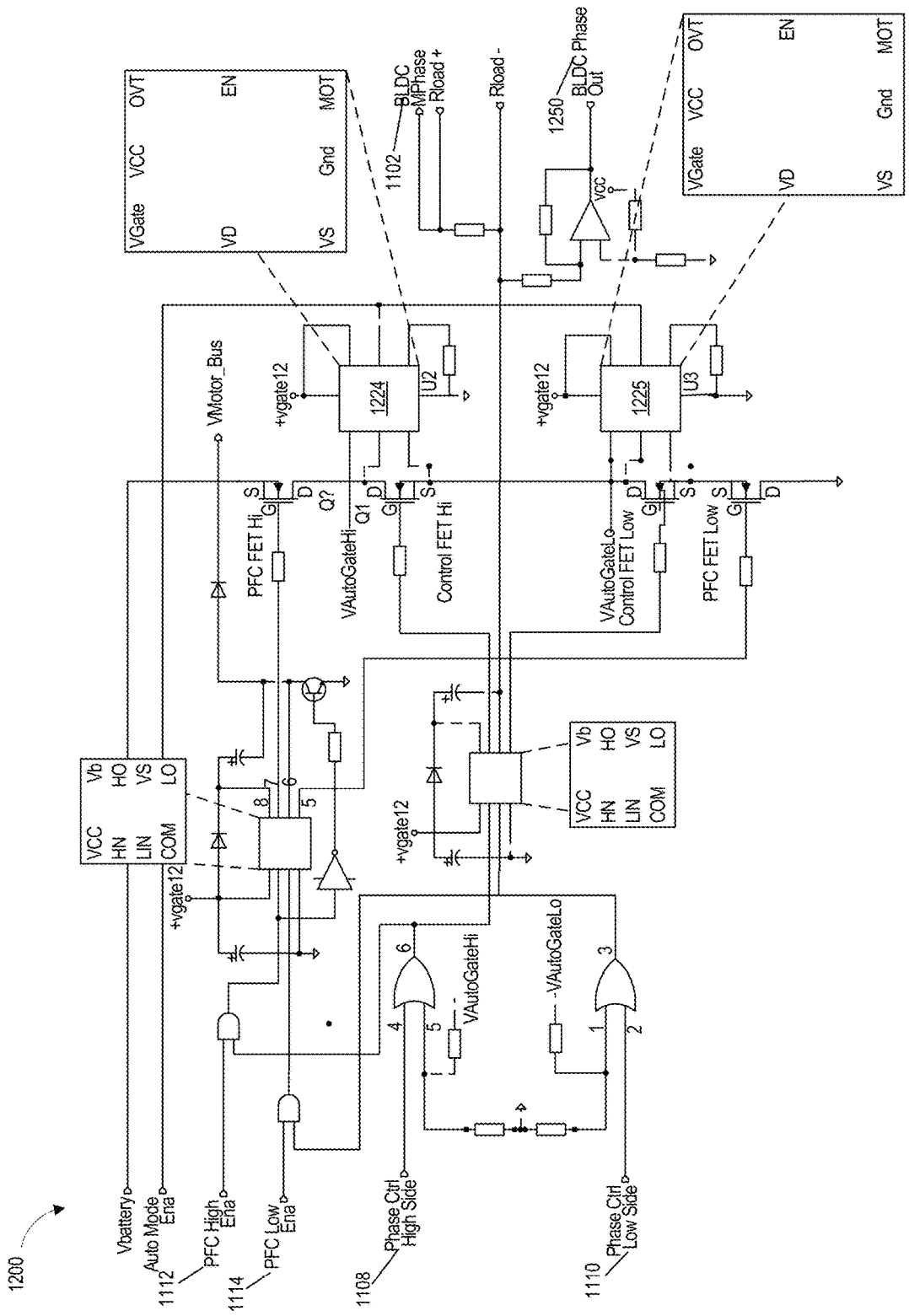
FIG. 12 is second exemplary circuit diagram of phase controllers within a motor-gen controller in a genset subsystem of a vehicle, in accordance with at least some embodiments.

FIG. 12 is second exemplary circuit diagram of phase controllers 1200 within a motor-gen controller in a genset subsystem of a vehicle, in at least some embodiments. The phase controllers 1200 are similar to that of the phase controllers 1100 of FIG. 11 except that the current detection circuit 1124 is replaced by a first current detection circuit 1224 and a second current detection circuit 1225. The first current detection circuit 1224 can detect current flow through a body diode of the high-side control switch 1118 and the second current detection circuit 1225 can detect current flow through a body diode of the low-side control switch 1122. The current detection circuits 1224 and 1225 can be implemented respectively by rectifier chips. Each rectifier chip can couple to respective drain terminal and source terminal of the control switches to determine whether the body diodes are active. The current detection circuits 1224 and 1225 can then output indication of which body diode is active to the gate control circuit 1126.

FIG. 12 also illustrates a phase position output signal 1250 to the microcontroller of the genset system. The phase position output signal is labeled as "BLDC Phase Out" in FIG. 12. The phase position output signal is an output to the microcontroller that indicates the phase position of the alternator phase 1102 when the phase controllers 1200 are in the Generator Mode. In some embodiments, only one of the three pairs of the phase controllers 1200 has this output. For example, the "U" pair of phase controllers has this output. A voltage scaler can be used to bring a peak of the phase position output signal 1250 down to a 5V max input voltage to be used by the microcontroller. The phase position output signal 1250 can also be fed into a voltage comparator so as to send the microcontroller a square pulse whenever the alternator phase 1102 passes every 30 degrees increment of rotation. In either case, the phase position output signal 1250 allows the microcontroller to sense when the microcontroller should switch the various phase controller control links 1108 and 1110 for each pair of the phase controllers 1200 during the microcontroller-directed "Assisted Rectification Modes."

7.0 Example of Diode-Based Phase Controllers

Figure 22:
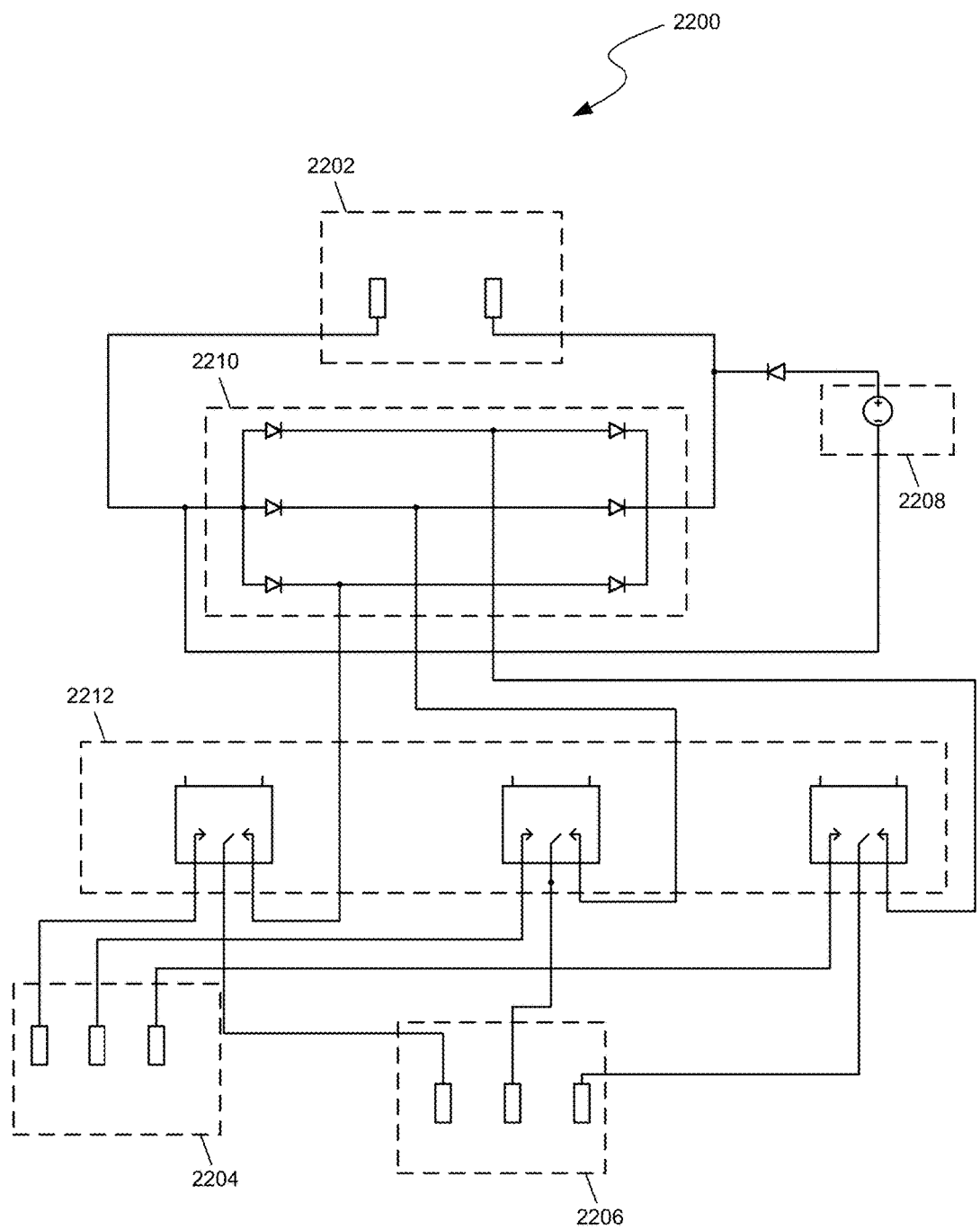
FIG. 22 is a third exemplary circuit diagram of phase controllers within a motor-gen controller in a gen-set subsystem of a vehicle, in accordance with at least some embodiments.

FIG. 22 is third exemplary circuit diagram of phase controllers 2200 within a motor-gen controller in a genset subsystem of a vehicle, in at least some embodiments. The phase controllers 2200 have similar functionalities as the phase controllers 1100 of FIG. 11 and the phase controllers 1200 of FIG. 12. The phase controllers 2200 include motor bus terminals 2202, ESC terminals 2204 (e.g., respectively coupled to the ESCs 106 of FIG. 1), alternator phase terminals 2206 (e.g., respectively coupled to different phases of a permanent magnet synchronous motor, such as the alternator phase 1102 of FIG. 11), or battery bus terminal 2208. The motor bus terminals 2202 are coupled to a motor bus of the vehicle (e.g., the DC motor bus 312 of FIG. 3). The motor bus terminals 2202 can couple in parallel to a three-phase rectifier circuit 2210. The three-phase rectifier circuit 2210 can include three sets of diode pairs. The phase controllers 2200 include three relays 2212. As illustrated in FIG. 22, each of the relays 2212 can be respectively coupled to the ESC terminals 2204, respectively coupled to the alternator phase terminals 2206, and respectively coupled to nodes between the diode pairs of the three-phase rectifier circuit 2210.

Figure 13:
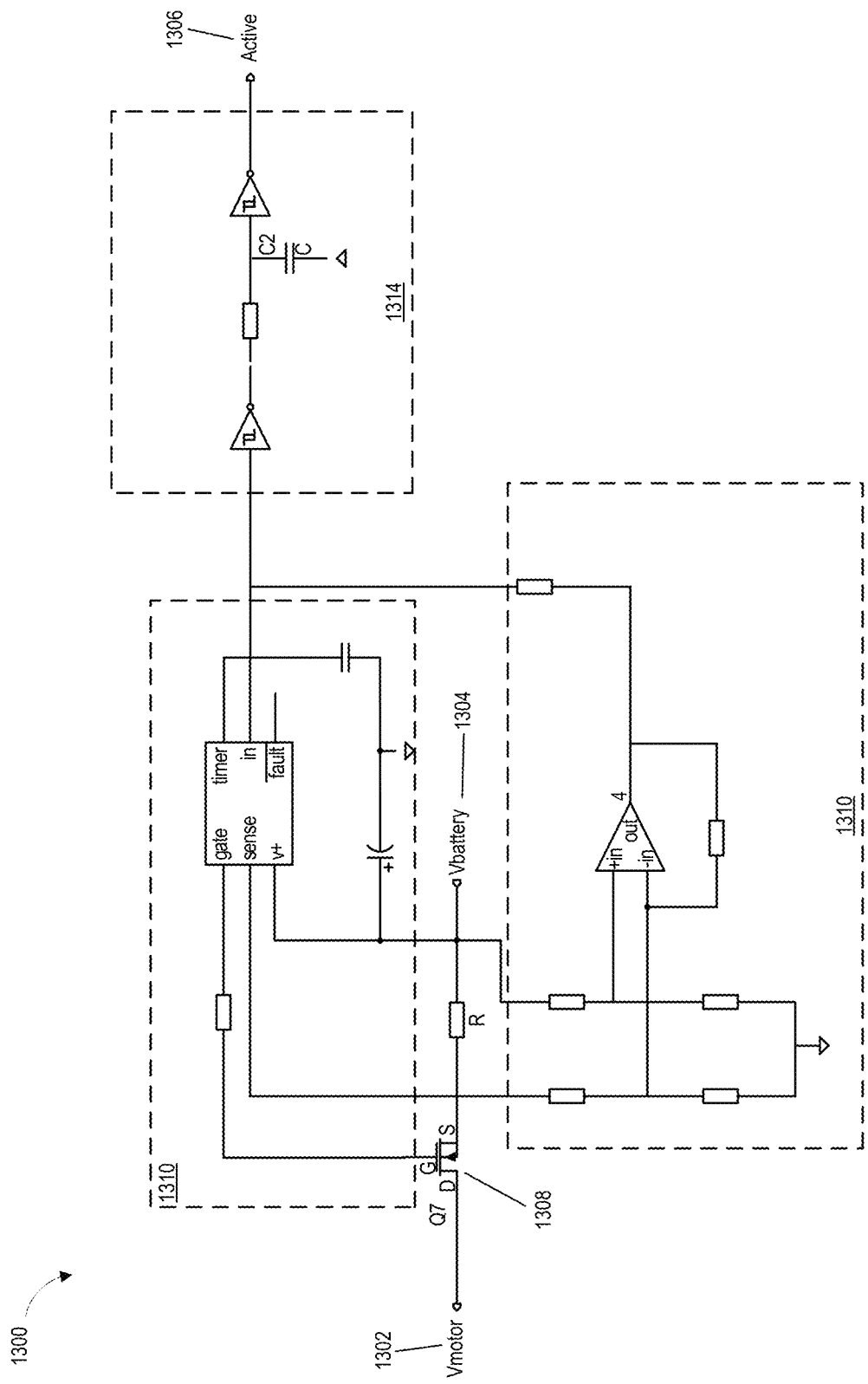
FIG. 13 is a first exemplary circuit diagram of an augmentation controller within a motor-gen controller in a genset subsystem of a vehicle, in accordance with at least some embodiments.

FIG. 13 is a first representative circuit diagram of an augmentation controller 1300 within a motor-gen controller in a genset subsystem of a vehicle, in at least some embodiments. For example, the motor-gen controller can be the MGC 318 in the genset subsystem 300 of FIG. 3. The motor-gen controller can include a microcontroller, such as the microcontroller 308 of FIG. 3. While in some embodiments the augmentation controller 1300 can be modeled as a diode, the following first exemplary circuit diagram illustrates an embodiment of the augmentation controller that tolerates high voltage drop/wattage dissipation (e.g., 5kA-6kA to dissipate), whereas a diode would easily break down at the operating current of the augmentation controller 1300. The first exemplary circuit diagram further enables detection of when the augmentation controller 1300 is active, in order to give feedback to the microcontroller.

The augmentation controller 1300 is coupled to a DC motor bus 1302 labeled "Vmotor," a battery bus 1304 labeled "Vbattery," an active indicator control link 1306 labeled "active." The DC motor bus 1302 can be the DC motor bus 312 of FIG. 3 or the DC motor bus 1014 of FIG. 10. The battery bus 1304 can be the battery bus 314 of FIG. 3 or the battery bus 1012 of FIG. 10. The active indicator control link 1306 maintains a first range of voltage when the augmentation controller 1300 is active (e.g., when an electric current above a threshold, such as zero amp, is flowing from the battery bus 1304 to the DC motor bus 1302). The active indicator control link 1306 maintains a second range of voltage when the augmentation controller 1300 is not active.

A current switch 1308, such as a transistor and more particularly a field effect transistor (e.g., metal-oxide-semi-conductor field effect transistor (MOSEFT)), can be coupled in between the battery bus 1304 and the DC motor bus 1302. In some embodiments, the current switch 1308 can be a bipolar transistor, such as an insulated-gate bipolar transistor (IGBT). The current switch 1308 may include a body diode, that enables some amount of the current to flow from the battery bus 1304 to the DC motor bus 1302 when the current switch 1308 is off, but not vice versa.

The augmentation controller 1300 includes a current detector circuit 1310. The current detector circuit 1310 here is illustrated as a comparator implemented by an op-amp. The comparator can detect when the body diode of the current switch 1308 is active. That is, when current is flowing from the battery bus 1304 to the DC motor bus 1302, a voltage drop across a resistor on the battery bus 1304 can be detected by the comparator. The comparator and thus the current detector circuit 1310 can indicate activity (i.e., current flowing from the battery bus 1304) by maintaining a third voltage range at its output terminal. The comparator and thus the current detector circuit 1310 can indicate non-activity (i.e., no or minimal current flowing from the battery bus 1304) by maintaining a fourth voltage range at its output terminal. For example, the fourth voltage range is lower than the third voltage range.

The output of the current detector circuit 1310 feeds into a transistor driver circuit 1312. The transistor driver circuit 1312 applies a voltage to a gate of the current switch 1308 to turn on the current switch 1308 allowing more current to flow through the current switch 1308 when the output of the current detector circuit 1310 indicates activity.

The output of the current detector circuit 1310 is also coupled to a timer circuit 1314. The timer circuit 1314 also has a second terminal coupled to the active indicator control link 1306. The timer circuit 1314 can maintain the first range of voltage at the active indicator control link 1306 when the current detector circuit 1310 indicates activity. The timer circuit 1314 can maintain the second range of voltage at the active indicator control link 1306 when the current detector circuit 1310 indicates non-activity. The timer circuit 1314 can maintain the first range of voltage at the active indicator control link 1306 when the current detector circuit 1310 switches between indicating activity and non-activity at a frequency higher than a preset threshold (e.g., around 900 Hz). For example, when the genset subsystem is operating in the Ripple Mitigation Mode, the augmentation controller 1300 and hence the current switch 1308 may be turned on and off in accordance with a frequency of the voltage ripples from the rectification process. The timer circuit 1314 presents a solid "on" state to the microcontroller even during the Ripple Mitigation Mode.

Figure 14:
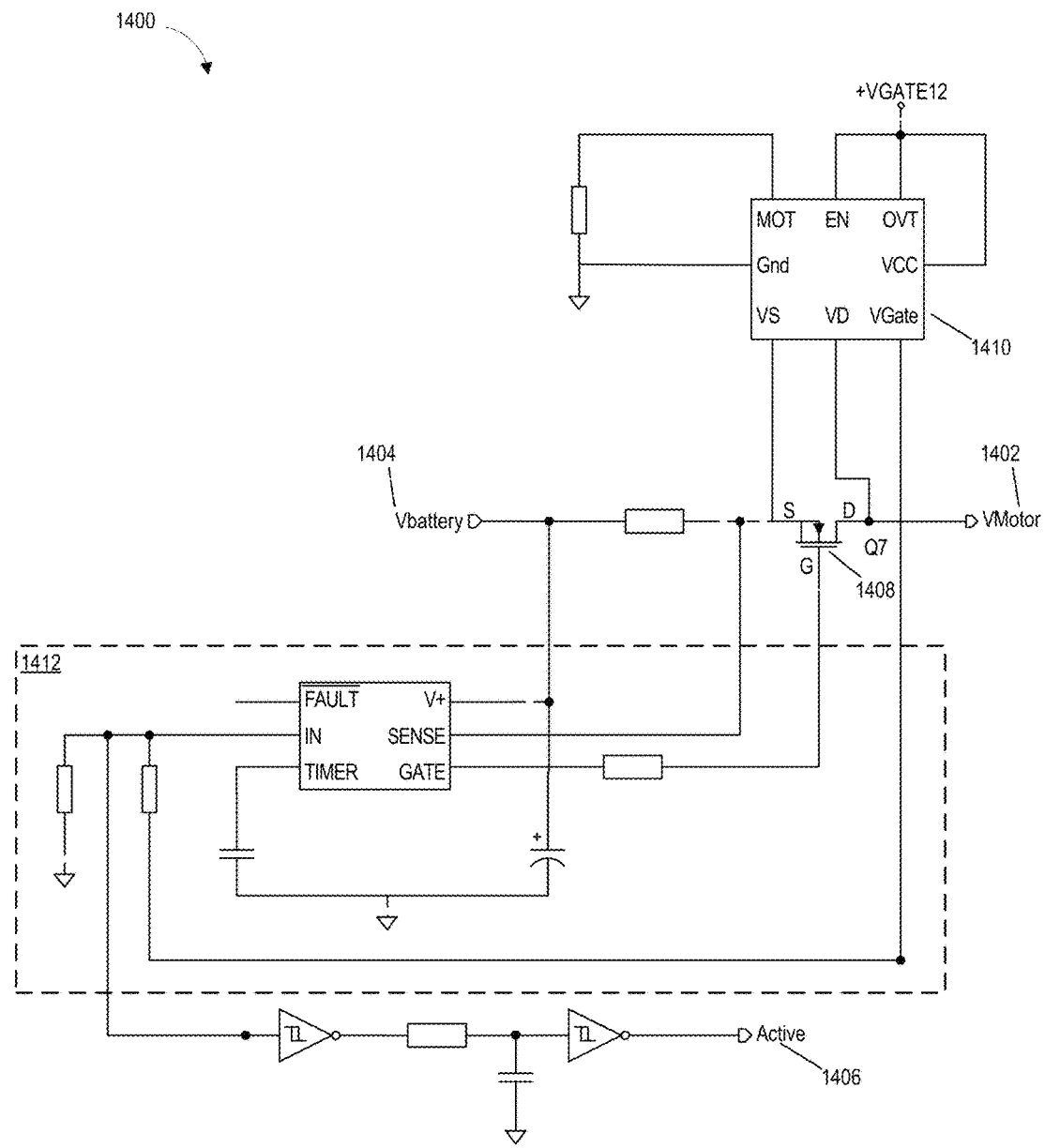
FIG. 14 is second exemplary circuit diagram of an augmentation controller within a motor-gen controller in a genset subsystem of a vehicle, in accordance with at least some embodiments.

FIG. 14 is second exemplary circuit diagram of an augmentation controller 1400 within a motor-gen controller in a genset subsystem of a vehicle, in at least some embodiments. The motor-gen controller can include a microcontroller, such as the microcontroller 308 of FIG. 3. The augmentation controller 1400 is similar to the augmentation controller 1300 of FIG. 3 except that the augmentation controller 1400 includes a rectifier chip 1410 instead of the current detector circuit 1310 of FIG. 13. The augmentation controller 1400 includes a DC motor bus 1402 labeled "Vmotor," a battery bus 1404 labeled "Vbattery," an active indicator control link 1406 labeled "active." The DC motor bus 1402 can be the DC motor bus 312 of FIG. 3 or the DC motor bus 1014 of FIG. 10. The battery bus 1404 can be the battery bus 314 of FIG. 3 or the battery bus 1012 of FIG. 10. The active indicator control link 1406 is similar to the active indicator control link 1306 of FIG. 13.

A current switch 1408, such as a transistor and more particularly a field effect transistor, can be coupled in between the battery bus 1404 and the DC motor bus 1402. The current switch 1408 may include a body diode similar to the current switch 1408, that enables some amount of the current to flow from the battery bus 1404 to the DC motor bus 1402 when the current switch 1408 is off, but not vice versa The rectifier chip 1410 may be separately coupled to a source terminal and a drain terminal of the current switch 1408. The rectifier chip 1410 can detect whether the body diode of the current switch 1408 is active by monitoring the source and drain terminals. If the body diode is active, the rectifier chip 1410 outputs a signal to a transistor driver circuit 1412, similar to the transistor driver circuit 1312, to instruct the transistor driver circuit 1412 to apply a turn-on voltage to a gate of the current switch 1408 and thus lowering the resistance from the source terminal and the drain terminal.

8.0 Flight Control

Figure 23:
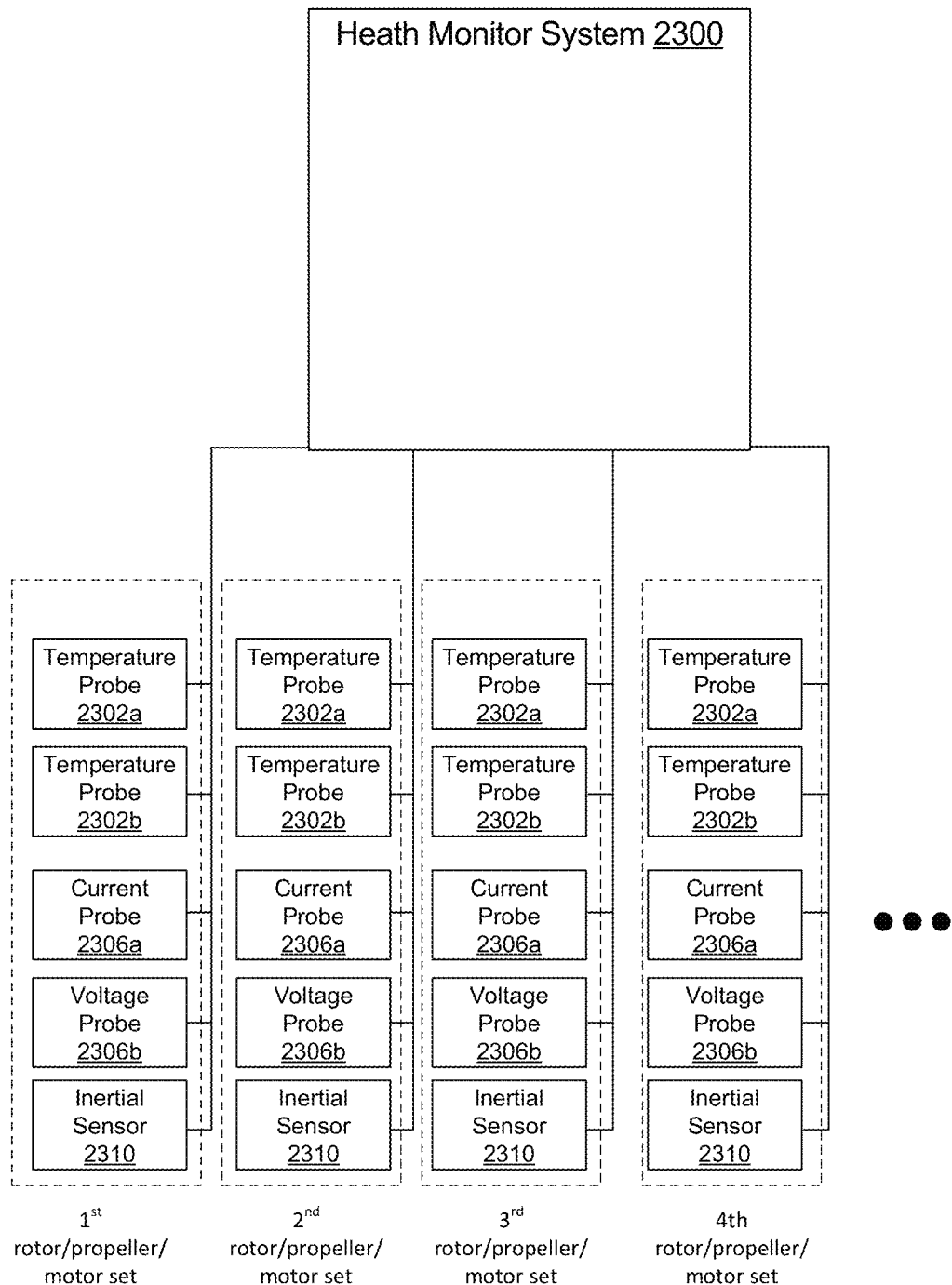
FIG. 23 is a block diagram illustrating a health monitor system in accordance with at least some embodiments.

FIG. 23 is a block diagram illustrating a health monitor system 2300, in accordance with at least some embodiments. The health monitor system 2300 can be implemented in the avionics subsystem 200, such as in the flight controller 202. The flight controller can receive commands from an autopilot module (e.g., the autopilot module 204 and translate those commands into signals to ESCs (e.g., the ESCs 106 of FIG. 1). The flight controller can be operatively coupled to the autopilot module 204 and at least one of the ESCs 106 to control the ESC based on a command from the autopilot module 204. In at least some embodiments, the flight controller can also implement the health monitor system 2300 to prevent and/or recover from various failure scenarios of the vehicle.

Without the health monitor system 2300, the autopilot module may not realize that a failure (e.g., in the motor or other control circuitry) has occurred until the vehicle starts to lose altitude or begins to spin out of control (e.g., as exhibited by variation in orientation). In these scenarios, even a 10 millisecond heads-up to the autopilot module can enable the autopilot module to maintain altitude and recover from the failure. Absent the early warning from the health monitor system 2300, the autopilot module may not be able to recover from the failure.

Failure scenarios can include damage to a propeller/rotor, damage to the bearings of the motor, electrical failures (e.g., to the ESCs), or any combination thereof. To detect these rotor scenarios, the health monitor system 2300 can couple to temperature probes 2302 (e.g., a temperature probe 2302a and a temperature probe 2302b, collectively referred to as the "temperature probes 2302"), electrical probes 2306 (e.g., a current probe 2306a and voltage probe 2306b, collectively referred to as the "electrical probes 2306"), and an inertial sensor 2310.

For example, the temperature probe 2302a can be attached at or substantially adjacent to the base of a motor (e.g., the drive motor 108 of FIG. 1) and the temperature probe 2302b can be attached at or substantially adjacent to an ESC (e.g., one of the ESCs 106). In some embodiments, the health monitor system 2300 can include only a single temperature probe. In some embodiments, the health monitor system 2300 can include more than two temperature probes. In some embodiments, the health monitor system can include multiple pairs of temperature probes, where each pair correspond to each pair of motor driver and ESC. The health monitor system 2300 can use the readings from the temperature probes 2302 to detect an electrical failure to at least one of the ESCs or bearing damage to at least one of the motor drivers.

For example, the current probe 2306a and the voltage probe 2306b can be attached to the circuitry of an ESC. The current probe 2306a can monitor the current usage of the ESC and detect short-circuits. The voltage probe 2306b can detect wiring failures (e.g., open circuits). In some embodiments, the health monitor system 2300 can include multiple pairs of electrical probes 2306. For example, each pair can correspond to one of the ESCs 106 of FIG. 1. The health monitor system 2300 can use the readings from the electrical probes 2306 to detect an electrical failure at one or more of the ESCs.

The inertial sensor 2310 can be a sensor for detecting mechanical vibrations. For example, the inertial sensor 2310 can be an accelerometer or other type of motion sensor. The inertial sensor 2310 can be attached to or substantially adjacent to the motor driver, the rotor/propeller, the shaft of the rotor, or any combination thereof. In some embodiments, the health monitor system 2300 can include at least one inertial sensor 2310 in each set of rotor/propeller/motor. The health monitor system 2300 can use the readings from the inertial sensor 2310 to detect abnormal vibration as a precursor to an impending failure to at least one of the rotor/propeller/motor. For example, wearing of a motor bearing or damage to a rotor may result in abnormal vibration.

The health monitor system 2300 can send a warning message to the autopilot module in response to detecting an existing or impending failure. In response to the warning message, the autopilot module can execute precautionary measures. For example, the autopilot module can shut down one or more of the propeller/rotor/motor/ESC sets that have been detected to be failing or about to fail. For another example, the autopilot module can implement a power reduction to one or more of the propeller/rotor/motor/ESC sets that have been detected to be failing or about to fail.

The health monitor system 2300 can provide direct and immediate feedback to the flight controller and/or the autopilot module that a propulsion system (e.g., a set of propeller/rotor/motor/ESC) has failed. For example, the health monitor system 2300 can determine that some part of a combination of a single rotor operate, a propeller, a motor, and an ESC has failed. The health monitor system 2300 can then implement in the flight controller and/or the autopilot module's flight control configurations that enable a much more graceful recovery from the failure.

In several embodiments, the autopilot module and/or the flight controller can make power adjustments to the remaining propulsion systems (e.g., non-failing propulsion systems) prior to a vehicle's attitude degrading (e.g., departing from level flight, or otherwise controlled flight). This resolves the problem of the flight controller being unable to recover a degraded flight plan when failure detection relies on altitude or other flight data. The health monitor system 2300 can not only sense a propulsion failure, but also predict an impending propulsion failure (e.g., vibration detected by the inertial sensor 2310). The health monitor system 2300 enables the flight controller and/or the autopilot module to apply flight control laws in advance of hazardous conditions before it even occurs. This enables the vehicle to have much more time to plan for flight recovery. As an example, rather than waiting until a propulsion module fails, a flight controller and/or an autopilot module can be configured to either reduce lift power, or even shut down on or more propulsion modules in advance of catastrophic failure. These options can be activated, on a pre-cautionary basis, in response to detection of a potential or impending failure.

In these embodiments, the health monitor system 2300 enables a flight controller and/or an autopilot module to avoid having to make sudden (e.g., not always successful) adjustments to flight control to compensate for failures. The vehicle protected by the health monitor system 2300 can prevent secondary effects of a propulsion module (e.g., lift module) failure, which include possible onboard fire, vehicle damage due to prop/motor fragments, and/or structural damage to due vibration.

Referring again to FIGS. 1-3 and FIG. 23, portions of components and/or modules associated therewith may each be implemented in the form of special-purpose circuitry, or in the form of one or more appropriately programmed programmable processors, or a combination thereof. For example, the modules described can be implemented as instructions on a tangible storage memory capable of being executed by a processor or a controller. The tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof. Memory space and storages described in the figures can be implemented with the tangible storage memory as well, including volatile or non-volatile memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module.

A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component. In some embodiments, at least some of the modules can be upgraded or modified remotely. The systems described in the figures may include additional, fewer, or different modules for various applications.

One feature of particular embodiments of the disclosed technology is that they can include a set of phase controllers for rectifying multiple AC phases from an alternator into a single DC voltage. An advantage of this feature is that the phase controllers enable a bi-directional AC to DC conversion. That is, the phase controllers can convert the AC phases into the DC voltage or commutate the alternator using a DC voltage supplied from a battery. Another advantage of this feature is the ability to provide timed disconnection of the AC phases during the rectification process, allowing an external microcontroller to provide power factor correction during the rectification process. Another feature is that the embodiments include an augmentation controller. An advantage of this feature is the ability to increase DC voltage supplied to an aerial vehicle's motor bus by combining the rectified voltage output from the phase controllers and the DC voltage output of a battery. Another advantage of this feature is the ability to remove voltage ripples from the rectified voltage output from the phase controllers. Yet another feature is that the embodiments include an ICE to provide DC power to drive the rotors of a multi-rotor vehicle. An advantage of this feature is that the ICE extends the endurance of the multi-rotor vehicle by utilizing high energy density liquid fuel.

9.0 UAV Configurations

FIG. 1B, discussed above, illustrates a representative vehicle on which power generation systems in accordance with any of FIGS. 1A and 2-14 can be installed. In further embodiments, such power generation systems can be installed on air vehicles having other configurations. For example, such power generation systems can be installed on air vehicles having a quad-rotor (rather than an octorotor) configuration. In still further embodiments, the configurations may be implemented without necessarily including power generation systems of the type described above with reference to FIGS. 1A and 2-14, and can instead include other power generation systems. Representative configurations can provide long endurance flight in both hover and cruise modes, as well as providing robust vertical take-off and landing capabilities, and are described below with reference to FIGS. 15-20.

Figure 15:
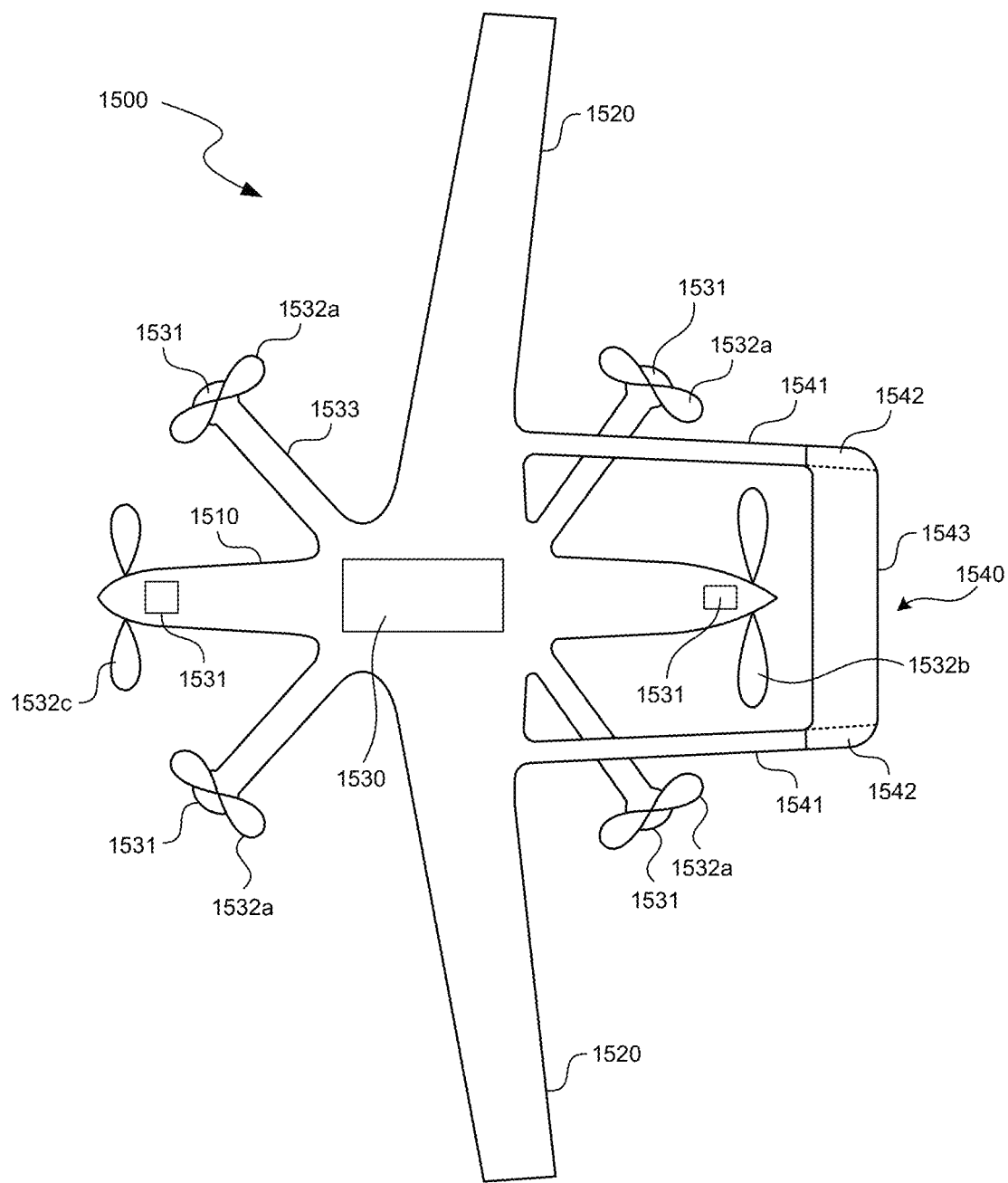
FIG. 15 is a partially schematic plan-view illustration of a vehicle having lift rotors and axial thrust rotors in combination with a power generation system configured in accordance with an embodiment of the present technology.

FIG. 15 illustrates an air vehicle 1500 having a fuselage 1510 that carries wings 1520 and a tail or empennage 1540. The tail 1540 can include dual vertical stabilizers 1542 carried on corresponding tail booms 1541, and a horizontal stabilizer 1543 extending between the vertical stabilizers 1542. Although not shown in FIG. 15, the wings 1520 can include suitable leading edge devices, trailing edge devices, flaps, and/or ailerons, and the tail surfaces can include suitable control surfaces, e.g., elevator surfaces, rudders, and/or trim tabs.

The vehicle 1500 can include multiple propellers or rotors 1532, including a plurality of lift rotors 1532a that can be used to provide the vehicle 1500 with a vertical takeoff and landing capability. Each of the lift rotors 1532a (four are shown in FIG. 15) can be driven by a corresponding electric motor 1531, and can be carried by a corresponding rotor boom 1533. The motors 1531 can be powered via a power generation system 1530. In particular embodiments, the power generation system 1530 can include a configuration generally similar to any of those described above with reference to FIGS. 1A and 2-14, and can accordingly include an internal combustion engine coupled to an alternator, which is in turn coupled to one or more motor/generator controllers, batteries, and/or other associated features.

The vehicle 1500 can also include one or more additional rotors, for example, a tail-mounted pusher rotor 1532b and/or a nose-mounted tractor rotor 1532c. In a particular embodiment, all of the foregoing rotors are driven by electric motors, with electrical power being supplied by the power generation system 1530. In a relatively simple embodiment of this arrangement, each of the rotors 1532 has a fixed geometry, e.g., a fixed pitch.

In operation, the lift rotors 1532a are activated for vertical takeoff. Once the vehicle 1500 has achieved a suitable altitude, the vehicle 1500 transitions to horizontal flight. This can be accomplished by increasing the thrust provided by the aft pair of lift rotors 1532a and/or decreasing the thrust provided by the forward pair of lift rotors 1532a. This procedure pitches the aircraft forward and downwardly and causes the thrust of each of the lift rotors 1532a to include a horizontal component. At the same time, the pusher rotor 1532b and tractor rotor 1532c are activated to provide an additional forward thrust component. As the vehicle 1500 gains speed in the forward direction, the wings 1520 provide lift. As the lift provided by the wings 1520 increases, the lift required by the lift rotors 1532*a* decreases. The transition to forward flight can be completed when the lift rotors 1532*a* are stopped (e.g., with the rotors aligned with the flight direction so as to reduce drag), while the wings 1520 provide all the necessary lift, and the tractor rotor 1532*c* and/or pusher rotor 1532*b* provide all the necessary thrust. The foregoing steps are reversed when the air vehicle 1500 transitions from forward flight to hover, and then from hover to a vertical landing.

In at least some embodiments, the foregoing configuration can be difficult to control during transitions between vertical and horizontal flight. In particular, when the vehicle transitions from vertical takeoff to horizontal forward flight, the vehicle pitches forward to allow the lift rotors 1532*a* to provide a thrust vector component in the forward direction. However, pitching the air vehicle 1500 forward reduces the angle of attack of the wings 1520, thereby reducing the ability of the wings 1520 to generate lift at just the point in the process when the wings 1520 are expected to increase the lift they provide. Conversely, during the transition from forward flight to hover (in preparation for a vertical landing), the typical procedure is to cut power to any axial thrust rotors (e.g., the pusher rotor 1532*b* and/or the tractor rotor 1532*c*) and allow the vehicle air speed to decrease to the point that the lift rotors 1532*a* may be activated. The time and distance it takes for the air vehicle speed to decrease sufficiently may be difficult to predict and/or adjust for (e.g., in changing wind conditions) and can accordingly make it difficult for the aircraft to land accurately at a predetermined target, without engaging in multiple attempts. In other embodiments, described further below with reference to FIGS. 16-18, the configurations can include wing geometries that are dynamically modifiable, variable, and/or configurable to address the foregoing drawbacks.

Figure 16:
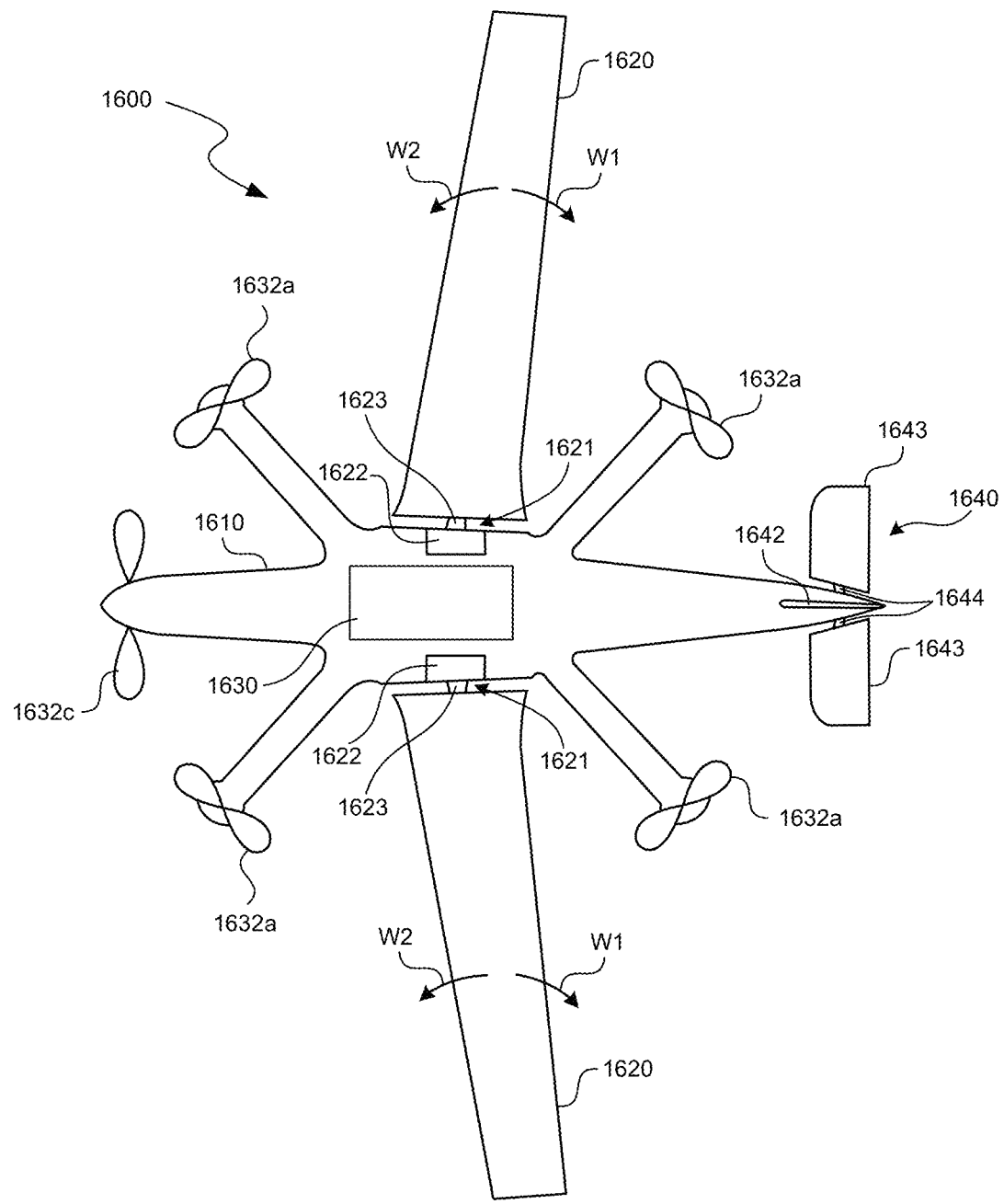
FIG. 16 is a partially schematic, plan-view illustration of a vehicle having multiple lift rotors, a tractor rotor, and dynamically modifiable wing geometries in accordance with an embodiment of the present technology.

FIG. 16 illustrates an air vehicle 1600 having wings 1620, a fuselage 1610, a tail 1640, and a power generation system 1630. The power generation system 1630 provides power to a tractor rotor 1632*c* and multiple lift rotors 1632*a*.

In a particular aspect of this embodiment, the wings 1620 can be configured to change orientation and/or geometry in a manner that accounts for the different pitch attitudes of the air vehicle 1600 as it transitions between vertical and horizontal flight. In particular, each of the wings 1620 can be coupled to the fuselage 1610 with a wing joint 1621 that allows the wing 1620 to move relative to the fuselage 1610. In a particular embodiment, the wing joint 1621 is a pivot joint and can accordingly include an axle 1623 that allows the wing 1620 to rotate relative to the fuselage 1610, as indicated by arrows W1 and W2. The pivot point can be at approximately the mid-chord location of the wing 1620 in some embodiments, and at other locations in other embodiments. Wing pivot motors 1622, which can receive power from the power generation system 1630, rotate the wings 1620 in the appropriate direction.

In operation, as the air vehicle 1600 transitions from hover to horizontal flight, the aircraft pitches forward (nose down) so that the lift rotors 1632*a* generate a thrust component along the horizontal axis, as described above with reference to FIG. 15. At the same time, the wings 1620 can pivot in an aft direction as indicated by arrows W1 so as to provide and/or maintain a suitably high angle of attack, even as the fuselage 1610 pitches forward. As a result, when the tractor rotor 1632*c* is activated, the wings 1620 will provide lift more quickly than if they were fixed and pitched downwardly in the manner described above with reference to FIG. 15.

When the air vehicle 1600 transitions from forward flight to hover, the foregoing operation can be reversed. The tractor rotor 1632*c* can be stopped and, as the forward air speed decreases, the forward pair of lift rotors 1632*a* can receive more power than the aft lift rotors 1632*a*. This will cause the vehicle to pitch nose up as well as providing a reverse thrust vector, so as to more quickly slow the air vehicle 1600 down. At this time, the wings 1620 can pivot forward, as indicated by arrow W2 so as to avoid stalling despite the relatively high angle of attack of the fuselage 1610. As a result, the vehicle 1600 can be slowed down and transitioned to hover in a quicker and more predictable manner than that described above with reference to FIG. 15.

In a particular embodiment, the empennage or tail 1640 of the air vehicle 1600 can be specifically configured to account for the variable angle of incidence of the wings 1620. In particular, the tail 1640 can include a fixed vertical stabilizer 1642 and rotatable stabilators 1643 rather than fixed horizontal stabilizers with movable elevators. Accordingly, the angle of attack of the entire horizontal stabilizing surface can be adjusted over a wide range of angles as the fuselage 1610 pitches upwardly and downwardly during transitions from and to horizontal flight. In particular, each stabilator 1643 can be coupled to the fuselage 1610 or empennage with an axle 1644, and can be driven by a corresponding motor (not shown in FIG. 16) which is in turn powered by the power generation system 1630. Accordingly, the stabilators 1643 can provide sufficient elevation control authority during relatively high pitch-up and pitch-down excursions of the aircraft.

Figure 17:
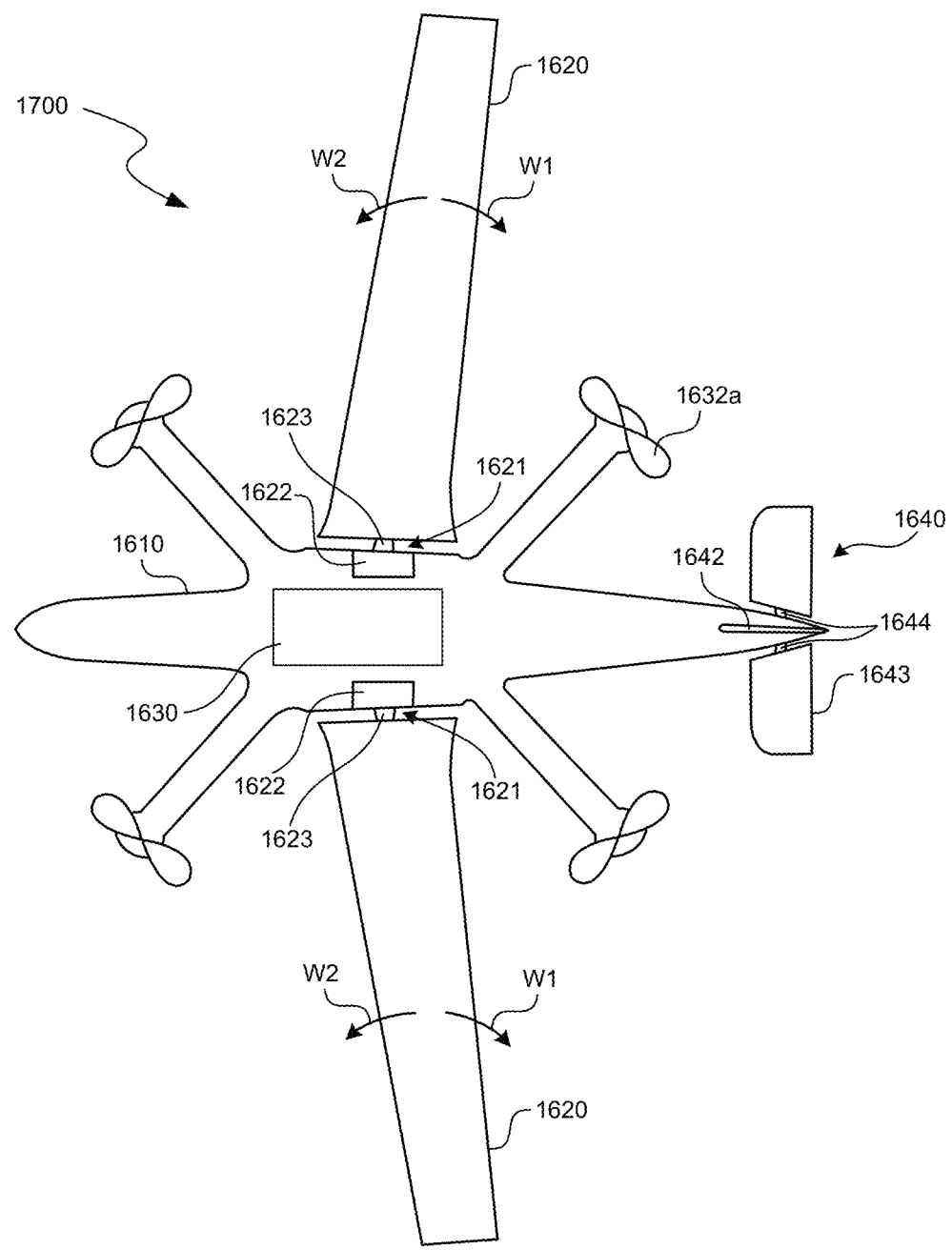
FIG. 17 is a partially schematic, plan-view illustration of an air vehicle having a configuration generally similar to that described above with reference to FIG. 16, without a tractor rotor.

FIG. 17 is a partially schematic, plan-view illustration of an air vehicle 1700 configured in accordance with another embodiment of the present technology. In a particular aspect of this embodiment, the air vehicle 1700 has a configuration generally similar to that described above with reference to FIG. 16, but lacks a tractor rotor 1632*c*. Instead, the air vehicle 1700 includes lift/thrust rotors 1632*d*. These rotors can have a configuration generally similar to those discussed above with reference to FIGS. 15 and 16, but rather than stopping during horizontal flight, the lift/thrust rotors 1632*d* can remain active during forward flight. To accomplish this result, the fuselage 1610 is pitched forward far enough to allow a component of the thrust provided by the lift/thrust rotors 1632*d* to be in a forward direction. The wings 1620 pivot aft as indicated by arrows W1 so as to provide lift despite the downward pitch attitude of the fuselage 1610.

One expected advantage of the configuration shown in FIG. 17 is that it can eliminate the need for a tractor rotor or pusher rotor, while still providing vertical takeoff, vertical landing, and forward flight capabilities. Conversely, an expected advantage of the configuration described above with reference to FIG. 16 is that the tractor rotor 1632*c* (and/or a pusher rotor) can produce a greater forward air speed, due to the increased forward thrust provided by such rotor(s). The speed and/or endurance of this configuration may also be increased by reducing the drag, which might otherwise result from the pitched-forward attitude of the fuselage 1710 shown in FIG. 17.

Figure 18:
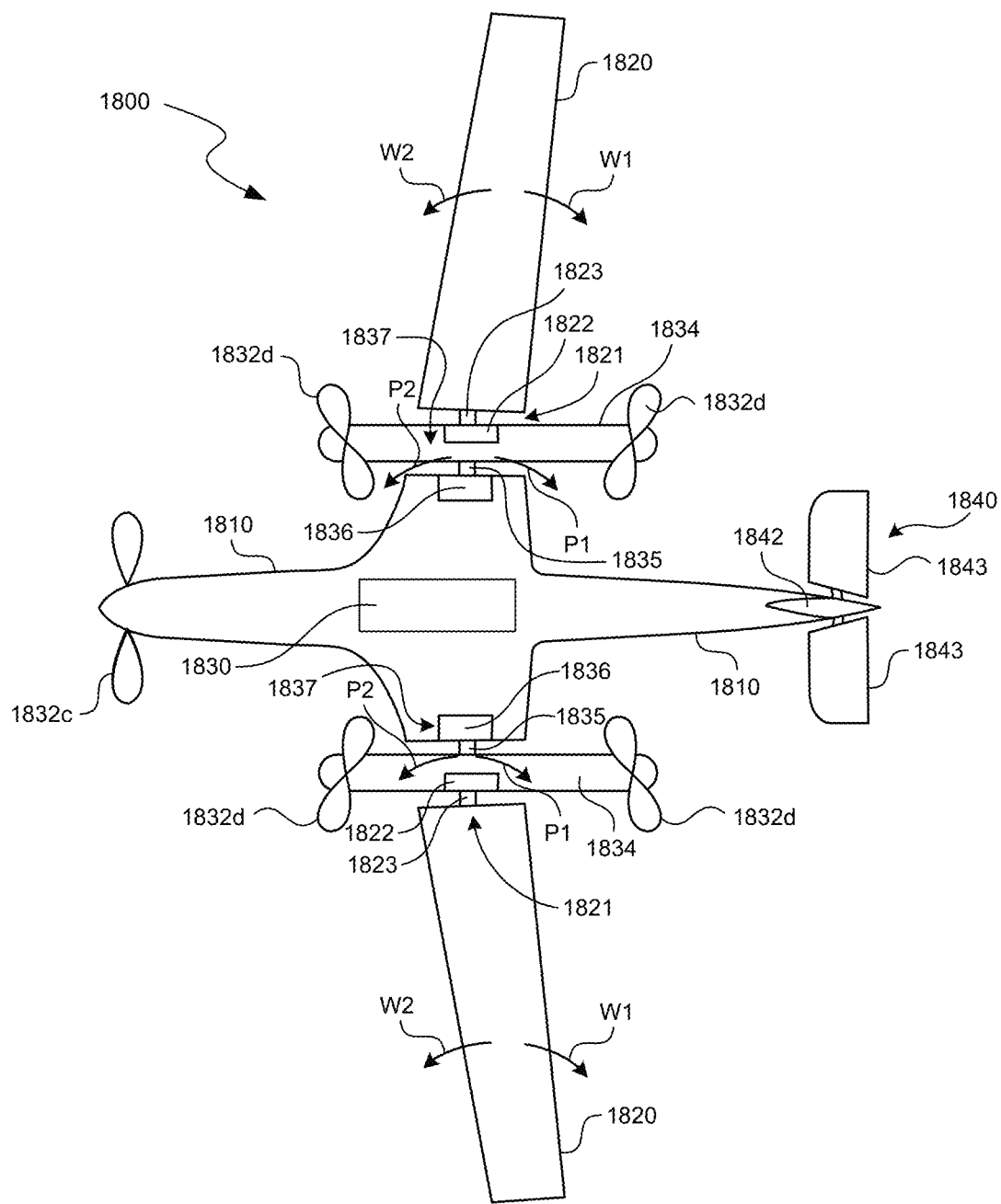
FIG. 18 is a partially schematic plan-view illustration of an air vehicle having dynamically modifiable wings and lift rotor pods in accordance with another embodiment of the present technology.

The lift rotors described above with reference to FIGS. 15-17 have rotation axes (i.e., the axes about which the rotors rotate) that are fixed relative to the fuselage of the UAV. In other embodiments, the rotation axes are moveable relative to the fuselage. For example, FIG. 18 is a partially schematic, plan-view illustration of an air vehicle 1800 having pivotable or otherwise moveable or configurable rotor pods 1834 configured in accordance with still further embodiments of the present technology. The air vehicle 1800 includes a fuselage 1810 that carries the rotor pods 1834, in addition to wings 1820 and a tail 1840. The rotor pods 1834 can each include pairs of lift/thrust rotors 1832d, which receive power from a power generation system 1830 configured generally similar to those discussed above. In a particular embodiment, the air vehicle 1800 can include a tractor rotor 1832c (and/or a pusher rotor, not shown in FIG. 18), and in other embodiments, the air vehicle 1800 does not include either a tractor rotor 1832c or a pusher rotor, as will be discussed further below.

The rotor pods 1834 and the wings 1820 are configured to be rotated independently of each other. For example, the rotor pods 1834 can be moveably coupled to the fuselage 1810 at corresponding pod joints 1837. Each pod joint 1837 can include a pod pivot axle 1835 driven by a corresponding pod pivot motor 1836 for rotating the corresponding lift rotor pod 1834 in an aft direction (indicated by arrow P1) and a forward direction (indicated by arrow P2). The wings 1820 can also be pivotable. Accordingly, each wing 1820 can be coupled to the corresponding lift rotor pod 1834 with a wing joint 1821. The wing joint 1821 can include a wing pivot axle 1823 driven by a wing pivot motor 1822 for rotating each wing 1820 relative to the lift rotor pod 1834 in an aft direction (as indicated by arrow W1) and a forward direction (as indicated by arrow W2).

In operation, the lift rotor pods 1834 and the wings 1820 can be pivoted independently of each other (e.g., in directions counter to each other) to allow a smooth transition from hover to horizontal flight and back again. In a further aspect of this embodiment, once forward flight is achieved, the lift rotor pods 1834 can be pivoted forward as indicated by arrows P2 by about 90° so that the lift/thrust rotors 1832d are facing directly forward and providing all the necessary forward thrust for the air vehicle 1800, while the wings 1820 provide the necessary lift. In such an embodiment, the tractor rotor 1832c can be eliminated. In still a further embodiment, the rotation of the lift rotor pods 1834 can eliminate the need for the wings 1820 to rotate, as will be described later with reference to FIG. 19.

With continued reference to FIG. 18, the air vehicle 1800 can include a tail 1840 having pivotable stabilators 1843 and a fixed vertical stabilizer 1842. As discussed above with reference to FIG. 17, the stabilator arrangement can provide sufficient control authorities even at high pitch angles. In other embodiments, the stabilator arrangement can be replaced with a fixed horizontal stabilizer arrangement, for example, when the independent rotation of the lift rotor pods 1834 and the wings 1820 eliminates the need for high aircraft pitch angles.

In another embodiment, the configuration shown in FIG. 18 can be simplified, e.g., by eliminating the wing pivot motor 122. Further aspects of this embodiment can include combining the wing pivot axle 1823 with the pod pivot axle 1835, so that (on each side of the fuselage 1810) a single axle extends from the fuselage 1810, through the rotor pod 1834 to the wing 1820. In yet a further aspect of this embodiment, the rotor pod 1834 then pivots freely on the axle. With this baseline configuration, the pivot motor 1836 (which was previously described as driving the rotor pod 1834) instead drives the wing 1820, as indicated by arrows W1 and W2. The rotational position of the rotor pod 1834 about the axle is determined by the normal dynamic lifting forces provided by the forward and aft rotors 1832d. For example, if the aft rotor 1832d provides a greater lifting force than the forward rotor 1832d, then the rotor pod 1834 will rotate (pitch) forward. For conventional lift, hover and landing maneuvers, the two lift rotors 1832d on each rotor pod 1834 can provide a combined lift force that maintains the air vehicle 1800 in a roughly horizontal orientation.

In yet a further simplification of the arrangement described immediately above, the pod pivot motor 1836 can be replaced with a releasable brake. When locked, the brake can prevent the rotor pod 1834 from rotating relative to the fuselage 1810. When the brake is unlocked, the rotor pod 1834 can rotate freely relative to the fuselage 1810. In either mode, the wing 1820 can remain in a fixed position relative to the fuselage 1810. During take-off, the brake prevents the fuselage 1810 (which may be nose-heavy) from pitching forward. Once the air vehicle 1810 attains a sufficient forward speed, and/or the tractor rotor 1832c provides sufficient airflow over the stabilators 1843, the stabilators 1843 can provide sufficient pitch control authority to allow the brake to be released. In one embodiment, the brake can be carried by the fuselage 1810, and in another embodiment, the brake can be carried by the rotor pod 1834.

In still another embodiment, the rotor pods 1834 can be positioned further away from the fuselage 1810, along the length of the wings 1820. Accordingly, the rotor pods 1834 are not connected directly to the fuselage 1810, but are instead connected between an inboard portion of the wing 1820 and an outboard portion of the wing 1820. In this configuration, the pods 1834 can be fixed or pivotable in accordance with any of the embodiments described above with reference to FIG. 18.

Figure 19:
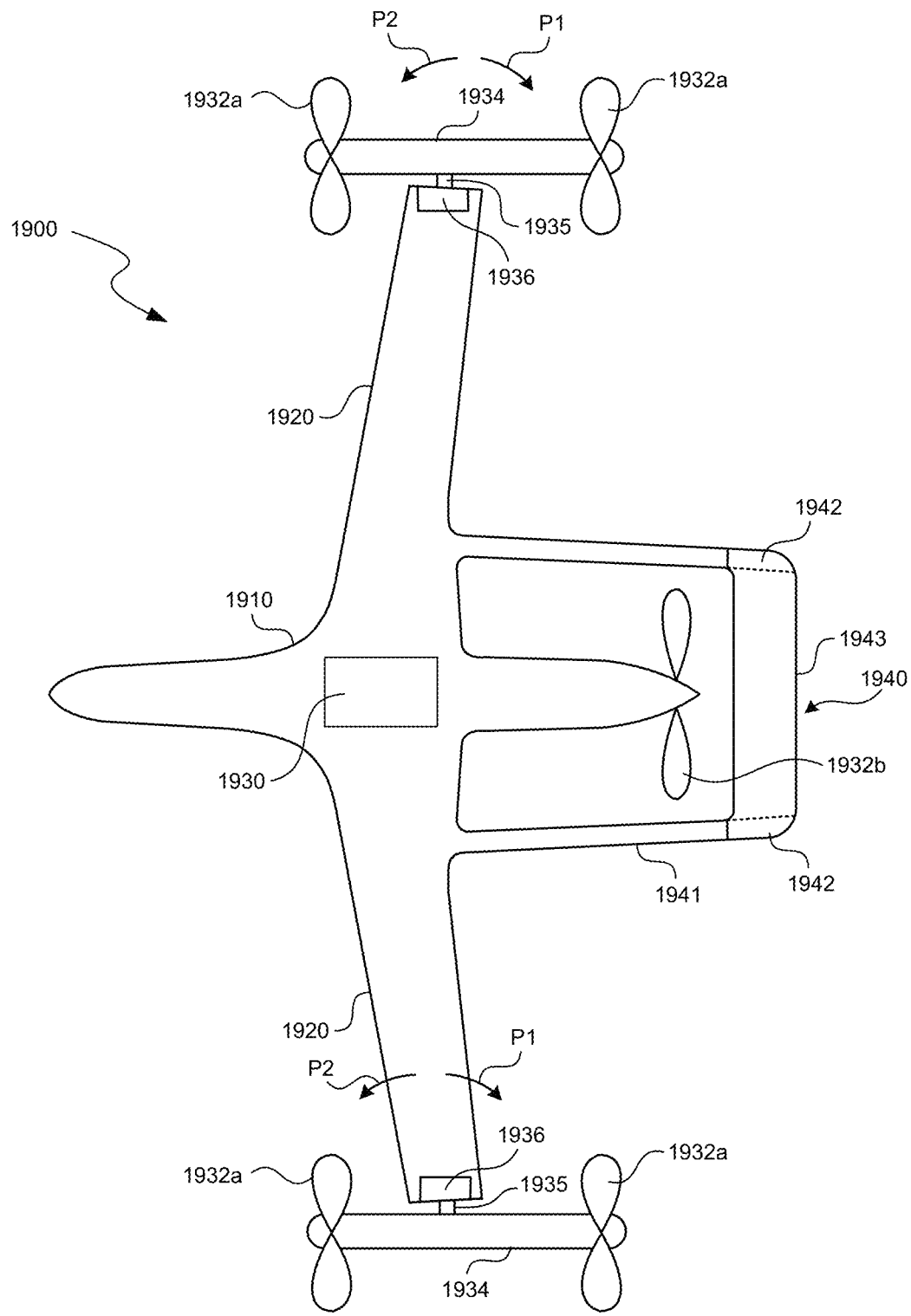
FIG. 19 is a partially schematic, plan-view illustration of an air vehicle having dynamically modifiable lift rotor pods in combination with a power generation system in accordance with an embodiment of the present technology.

FIG. 19 illustrates an air vehicle 1900 configured in accordance with still a further embodiment of the present technology. In one aspect of this embodiment, the vehicle 1900 include wings 1920 that are fixed to a corresponding fuselage 1910. Lift rotors 1932a are carried by rotor pods 1934 located at the outboard ends of the wings 1920. The rotor pods 1934 can be rotated relative to the wing 1920 (as indicated by arrows P1 and P2) via corresponding pod pivot motors 1936 and pod pivot axles 1935. The lift rotors 1932a are powered by a power generation system 1930, which can also power an optional pusher rotor 1932b or tractor rotor (not shown in FIG. 19). The tail 1940 can include twin booms 1941, each carrying a vertical stabilizer 1942, with a horizontal stabilizer 1943 carried by the vertical stabilizers 1942. In other embodiments, the tail 1940 can have other configurations. In some configurations, the air vehicle 1900 can include a pusher rotor 1932b, and in other configurations, the pusher rotor 1932b can be eliminated.

One potential advantage of the configuration shown in FIG. 18 compared to that shown in FIG. 19 is that the rotor pods are closer to the fuselage, therefore reducing the bending load on the wing. Conversely, one potential advantage of the arrangement shown in FIG. 19 relative to that shown in FIG. 18 is that the number of pivot joints is reduced.

Figure 20:
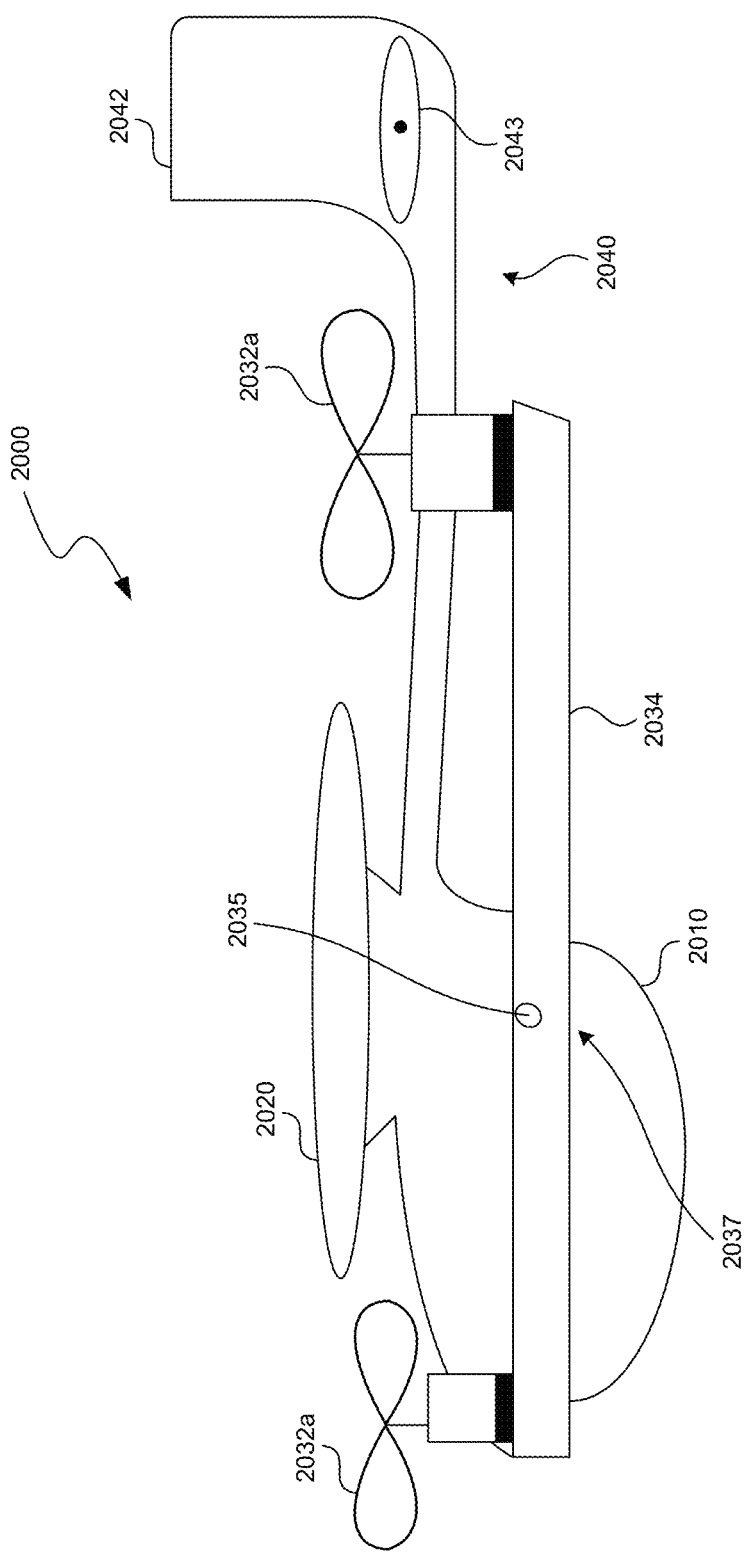
FIG. 20 is a partially schematic, side view of an air vehicle having a fixed wing and a movable rotor boom in accordance with yet another embodiment of the present technology.

FIG. 20 is a partially schematic, side-view illustration of an air vehicle 2000 having a movable, changeable and/or otherwise configurable lift rotor boom in accordance with another embodiment of the present technology. In one aspect of this embodiment, the air vehicle 2000 includes two lift rotor booms 2034 (one of which is visible in FIG. 20), each of which carries a pair of lift rotors 2032a. Each boom 2034 can be coupled to the fuselage 2010 with a boom joint 2037. In a particular embodiment, the boom joint 2037 can include a boom pivot axle 2035 that allows the lift rotor boom 2034 to pivot clockwise and counter-clockwise relative to the fuselage 2010. The air vehicle 2000 can also include a fixed wing 2020. In a particular aspect of this embodiment, the wing 2020 has a high-wing configuration so as to increase the spacing between the wing 2020 and the boom joint 2037.

This arrangement allows the lift rotor boom 2034 to pivot through a suitable angle without interfering with the wing.

In operation, the lift rotor boom 2034 can be positioned (e.g., locked) in the generally horizontal orientation shown in FIG. 20 during a vertical takeoff (and landing) maneuver. To transition to horizontal flight, the lift rotor boom 2034 pivots counter-clockwise such that the lift rotors 2032a are positioned to provide a forward thrust component to the air vehicle 2000. Because the air vehicle 2000 need not pitch downwardly to place the lift rotors 2032a in this orientation, the wing 2020 can remain fixed relative to the fuselage 2010. In a particular aspect of this embodiment, the air vehicle 2000 can include a tail or empennage 2040 having a vertical stabilizer 2042 and a horizontal stabilator 2043. The stabilator 2043 (as opposed to an elevator) can provide sufficient control authority to handle pitching moments that may be caused by the moving lift rotor boom 2034.

One feature of the configuration shown in FIG. 20 is that the pivoting lift rotor boom 2034 can eliminate the need for a movable wing. As a result, the wing 2020 can provide suitable lift without changing its incidence angle. In addition, the pivot angle through which the lift rotor boom 2034 travels is sufficient to direct forward thrust from the lift rotors 2032a without the need for a pusher or tractor rotor.

Figure 21:
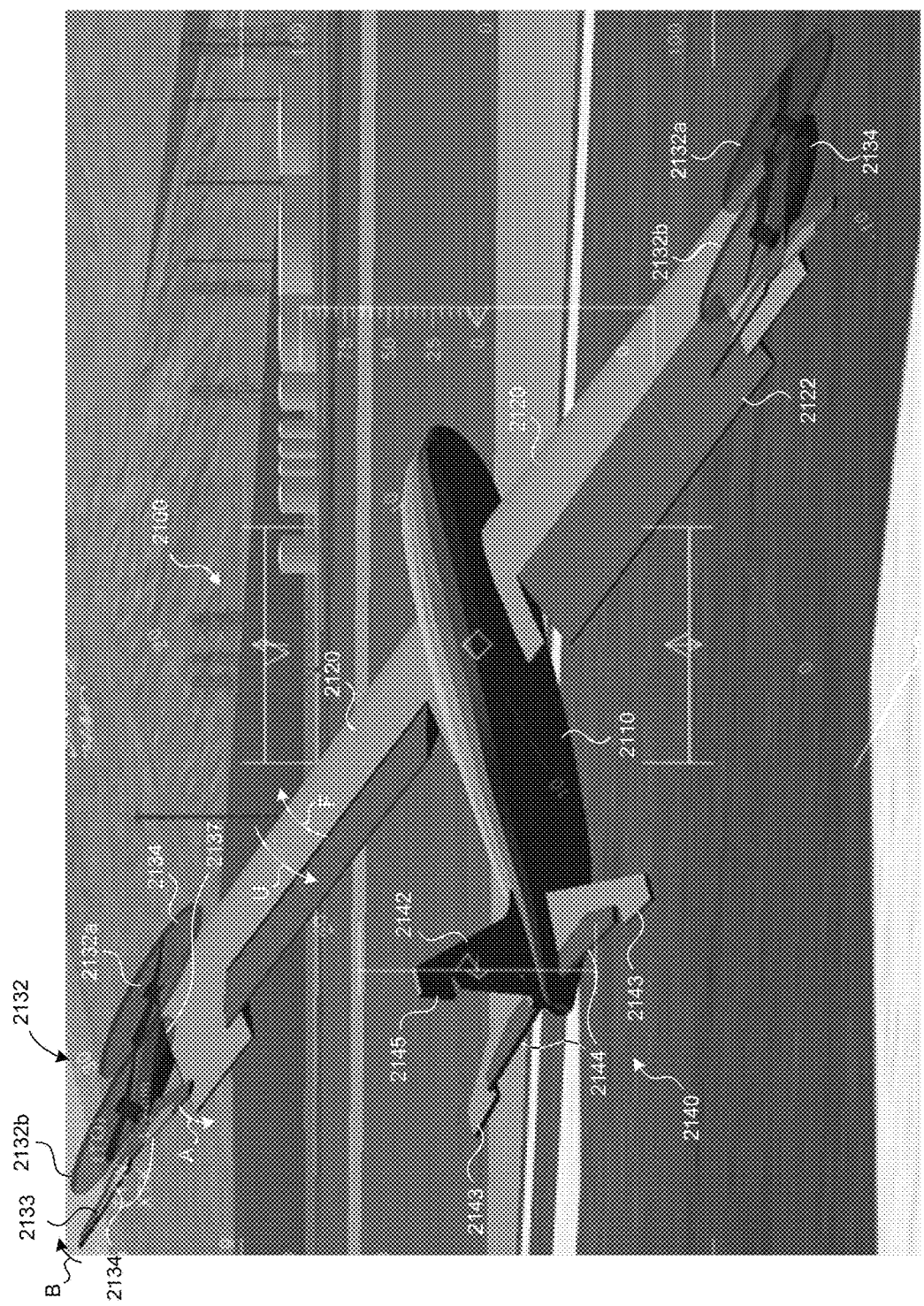
FIG. 21 is a partially schematic, top isometric view of an air vehicle having lift rotor pods that are controllable in accordance with another embodiment of the present technology.

FIG. 21 is a partially schematic, top isometric illustration of an air vehicle 2100 having lift rotors that can be pitched between a generally forward-facing position and a generally upward-facing position, in accordance with yet another embodiment of the present technology. In one aspect of this embodiment, the air vehicle 2100 includes a fuselage 2110, wings 2120 extending outwardly from the fuselage 2110, and a tail or empennage 2140 positioned aft of the wings 2120. The empennage 2140 can include a vehicle horizontal stabilizer 2143 and a vehicle vertical stabilizer 2142. The horizontal stabilizer 2143 can include a vehicle rudder 2145 for controlling vehicle yaw, and the horizontal stabilizer 2143 can include vehicle elevators 2144. The vehicle elevators 2144 can be activated to control the overall pitch attitude of the air vehicle 2100.

The air vehicle 2100 can further include multiple pitch rotors 2132 that can be used to lift the air vehicle 2100 and/or provide forward thrust for the air vehicle 2100, depending on factors that include the orientation of the rotors 2132. Accordingly, the rotational axes of the rotors 2132 can be reoriented relative to the air vehicle's direction of flight. In a particular embodiment, the rotors 2132 can be carried by corresponding rotor pods 2134. The rotor pods 2134 can be carried toward the ends of the wings 2120, in an embodiment shown in FIG. 21, and can be carried at other locations of the vehicle in other embodiments. In any of these embodiments, the rotor pods 2134 can be rotatable relative to the wings 2120 and/or the fuselage 2110 and can be coupled to the wings 2120 at corresponding pod joints 2137. Accordingly, each rotor pod 2134 can be rotated toward a forward-facing position (as indicated by arrow F) and can be rotated in the opposite direction toward an upward-facing orientation, as indicated by arrow U.

The rotors 2132 can include forward rotors 2132a positioned forward of aft rotors 2132b when the corresponding rotor pod 2134 is in a generally horizontal, upward-facing position. In at least some multi-rotor aircraft, the rotor pods 2134 are rotated by increasing the force differential between the force provided by the aft rotor 2132b and the force provided by the forward rotor 2132a. For example, if the aft rotor 2132b is powered to provide more force than the forward rotor at 2132a, then it lifts the aft portion of the rotor pod 2134, causing the rotor pod 2134 to rotate in the forward direction, as indicated by arrow F. To rotate the rotor pod 2134 in the opposite direction (indicated by arrow U), the force deferential is reversed, with the forward rotor 2132a providing more force than the aft rotor 2132b.

In at least some embodiments, when the air vehicle 2100 has a significant portion of its lift provided by airflow over the wings 2120, the available force differential between the aft rotor 2132b and the forward rotor 2132a can be relatively small. Accordingly, it can be difficult to rotate the rotor pod 2134 when the air vehicle 2100 has a significant forward velocity. To address this potential issue, embodiments of the air vehicle 2100 can include one or more pod elevators 2134 that can be actuated to change the pitch angle of the rotor pod 2134 and therefore the orientation of the rotors 2132, even at relatively high forward air speeds. In particular, the pod elevators 2134 can rely on the relatively high forward air speed to provide the aerodynamic forces used to pitch the rotor pod 2134 in the directions indicated by arrows F and V. For example, in a representative embodiment, the rotor pods 2134 can each include a pod horizontal stabilizer 2133 that carries the pod elevator(s) 2134. To pitch the rotor pod 2134 and rotors 2132 forward, as indicated by arrow F the pod elevators 2134 are rotated downwardly relative to the pod horizontal stabilizer 2133, as indicated by arrow A. To rotate the rotor pod 2134 in the opposite direction, as indicated by arrow U, the pod elevators 2134 are rotated upwardly, as indicated by arrow B.

In one aspect of the foregoing embodiments described above with reference to FIG. 21, the system can include features to prevent or inhibit Dutch roll. In one embodiment, the system can include a torque tube that extends through the wings 2120 to connect the pods 2134 and synchronize the motion of the pods. In another embodiment, the pods 2134 can be locked, for example, during low speed operation (which is where Dutch roll typically occurs) to prevent or reduce Dutch roll. The pods 2134 can then be unlocked at higher speeds where Dutch roll is less likely. In still another embodiment, the elevator control can be replaced with actuators that drive the pods 2134, generally in the manner described above with reference to FIG. 19.

One advantage of at least some of the features described above with reference to FIG. 21 is that the pod elevator 2134 can improve the ability for the rotors 2132 to rotate at relatively high vehicle air speeds. In particular, at such air speeds, it may be difficult for the rotors to change orientation based solely on the differential force available between the forward and aft rotors 2132a, 2132b.

One feature of several of the embodiments described above with reference to FIGS. 15-20 is that they can include power generation systems that provide electric power to one or more rotors via an internal combustion engine coupled to an alternator, battery, and associated switching features. Accordingly, the foregoing power generation arrangements, features, and techniques need not be limited to octo-copters, but can instead be applied to a variety of unmanned air vehicle configurations.

Another feature of at least some of the foregoing configurations is that they can include one or more lift rotors in combination with one or more tractor/pusher rotors, all of which can be electrically driven, with electrical power provided by a combustion engine in combination with an alternator, battery and associated switching features. An associated feature is that electrical power can be available to any propeller or rotor at any time, independent of the flight mode of the aircraft (e.g., independent of whether the aircraft is taking off, cruising, hovering, landing or engaging in another maneuver). An advantage associated with this level of flexibility is that it can improve the smoothness, speed, and/or efficiency of transitions between one mode and another. Another advantage is that it allows the operator (human and/or automated control system) to select from multiple possible combinations of lift forces. Accordingly, the operator can select the combination that provides the desired performance characteristic for a given mission and/or portion of a mission. The performance characteristic can include endurance, speed, number of take-off and landing cycles, and/or other measures. For any of these characteristics, the ability to control what fraction of lift is provided by the wings and what fraction is provided by the lift rotors can improve the performance characteristic. For example, the configurations described above can support long endurance forward flight at speeds less than would be permissible by a fixed wing aircraft, due to the lift available from the lift rotors. The endurance can also be greater than that available with a basic quadrotor vehicle, due to the lift provided by the wings.

Another feature of at least some of the foregoing embodiments is that the wings can have a variable geometry and/or configuration. An advantage of this feature is that it can improve the transitions between horizontal and vertical flight, for example, by reducing the amount of time required to make the transition, by making the transition smoother, and/or by making the transition more predictable and repeatable, thus improving the accuracy with which the aircraft can be directed. Particular embodiments were described above in the context of pivoting wings, e.g., wings for which the entire chord pivots so as to change the angle of attack of the wing as opposed to conventional pivoting leading and/or trailing edges. In other embodiments the wings can have other arrangements including wing warping arrangements, and/or an arrangement of leading and/or trailing edge devices that allow the angle of attack and center of lift of the wing to be changed dynamically. The foregoing embodiments differ from conventional arrangements of deployable leading and trailing edges devices. Such conventional devices can shift the center of lift of an airfoil, but do not directly change the angle of attack of the airfoil—instead, the angle of attack of the airfoil may change as an end result of the aerodynamic forces acting on the leading and/or trailing edge devices, if those forces are not counteracted. Still further embodiments include any suitable combination of the foregoing features (e.g., variable geometry wings, variable incidence or angle of attack wings, and/or leading or trailing edge devices that vary the center of lift). Configurations in accordance with any of the foregoing embodiments can include the same or a suitable different number of vertical lift rotors, tractor rotors and/or pusher rotors.

The foregoing features alone and/or in combination with other features described herein, can provide several advantages when compared with existing quadrotor or quadcopter configurations. For example, conventional quadrotor UAVs that rely exclusively on electric power produced by on-board batteries typically have a relatively short range, at least in part because the lift rotors use a significant amount of power and do not take advantage of lift created by the flow of air over a fixed lifting surface (e.g., a wing). Typical fixed rotor vehicles can have a significantly limited forward flight speed and range, and, due to the power required to maintain a hover configuration, can suffer from poor hover endurance. Still further, the constraints on endurance typically limit such configurations to one takeoff and one landing cycle per battery charge.

Conventional hybrid quadrotors, which have a wing in addition to lift rotors, typically use electric motors for lateral motion and lift, or electric motors for lift and gas-driven motors for lateral motion. Both configurations can provide more endurance than an all-electric multi-rotor vehicle. For example, conventional hybrid quadrotors can take off and land more than once. However, such conventional hybrid quadrotors are still limited in the number of takeoff and landing cycles they can complete with the limited on-board energy supply. In addition, such vehicles can have limited endurance because the lift rotors do not contribute significantly to forward thrust during forward flight, and instead are typically stopped during forward flight.

Aircraft in accordance with several of the configurations disclosed herein can overcome some or all of the conventional vehicle drawbacks described above. In particular, such aircraft can achieve long endurance in a forward flight mode and long endurance in a hover mode. Such aircraft can take off and land multiple times and may therefore be suitable for missions (e.g., package delivery) that require and/or benefit from this capability. Furthermore, such vehicles can operate at slow forward speeds, e.g., below the normal wing stall speed, by using augmented lift available from the lift rotors, and/or adjusting the angle of attack of the wing such that the wing is unstalled or remains at an angle of attack below the critical angle of attack, even at a low forward speed.

Still further embodiments can provide additional advantages. For example, many of the configurations described herein are designed to take off and land vertically and accordingly may not include conventional landing gear. Instead, such vehicles can include skids. However, in particular embodiments, the vehicles can be configured to include wheeled landing gear or other landing gear that allow for a takeoff and/or landing roll. Normally, such vehicles would include flaps to increase lift at low speeds. Vehicles in accordance with embodiments of the present technology need not include flaps, and can instead rely on lift rotors to provide lift at a low forward speed during approach and landing. One instance in which such a capability may be advantageous is if one of the lift rotors (e.g., one of four lift rotors) fails prior to landing. In such a condition, the vehicle cannot be readily controlled in hover and in particular, the non-operational rotor reduces the available yaw authority to the point where a controlled vertical landing is difficult or impossible. However, with configurations in accordance with those described above, the remaining active lift rotors can be re-oriented (e.g., pivoted) to provide air flow over a tail surface of the vehicle to provide stability and control about the yaw axis. In addition to or in lieu of the foregoing, the variable incidence wing can allow the vehicle to land at low forward air speeds without the need for flaps. In a particular aspect of the foregoing embodiments, an additional one of the lift rotors may be deliberately stopped (e.g., so that only two lift rotors are active in a four-rotor configuration, with one rotor inactive due to a malfunction, and the other deliberately shut down) to provide for a symmetric configuration.

From the foregoing, it will be appreciated that specific embodiments of the disclosed technology have been described herein for purposes of illustration, but that various modifications may be made without deviating from the technology. For example, the number of alternator AC phases may be only two phases or may be more than four phases. Certain aspects of the invention described in the context of particular embodiments may be combined or eliminated in other embodiments. For example, the microcontroller, the augmentation controller, and the phase controllers can be combined into an integrated circuit. An individual motor and/or actuator can power multiple devices, e.g., multiple rotatable wings. Particular embodiments were described above in the context of vehicles with four lift rotors. In other embodiments, the vehicles can include more rotors, e.g., eight rotors arranged in two rows of four, or four pairs of co-axial, counter-rotating lift rotors. Aspects of the foregoing embodiments have been described generally in the context of UAVs. In other embodiments, air vehicles having configurations and/or battery augmented power systems generally similar to those described above can be used for manned flight. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A multi-rotor vehicle system comprising:
    a direct current (DC) powered motor coupleable to a rotor;
    an electronic speed controller coupled to the DC-powered motor to control the speed of the DC-powered motor by regulating electric current supplied to the DC-powered motor; and
    a genset subsystem coupled to the electronic speed controller to power the electronic speed controllers through a DC motor bus, wherein the genset subsystem includes:
        a battery set including one or more batteries;
        an alternator having a mechanical movement input and a multiphase alternating current (AC) output; and
        a motor-gen controller having a phase control circuit configured to rectify the multiphase AC output of the alternator to produce a rectified DC feed to the DC-powered motor; and
        wherein the motor-gen controller is activatable to draw DC power from the battery set to produce the rectified DC feed.

2. The multi-rotor vehicle system of claim 1, wherein the motor-gen controller is configured to commutate the alternator by drawing DC power from at least one battery in the battery set.

3. The multi-rotor vehicle system of claim 1, wherein the motor-gen controller is configurable to draw the DC power from only a subset of the batteries in the battery set.

4. The multi-rotor vehicle system of claim 1, wherein the alternator is a brushless DC (BLDC) alternator.

5. The multi-rotor vehicle system of claim 1, wherein the genset subsystem further comprises:
    an augmentation controller configured to fill in voltage ripples in the rectified DC feed from the phase control circuit using the DC power from the battery set.

6. The multi-rotor vehicle system of claim 5, wherein the augmentation controller is configurable to provide that the alternator produces less voltage than a nominal voltage of a battery in the battery set.

7. The multi-rotor vehicle system of claim 1, wherein the phase control circuit further comprises phase controllers implemented by transistors to thereby enable lossless rectification.

8. The multi-rotor vehicle system of claim 1, wherein the phase control circuit further comprises diodes.

9. The multi-rotor vehicle system of claim 1, further comprising: a fuel-based power source that generates mechanical movement and is coupled to the mechanical movement input of the alternator.

10. The multi-rotor vehicle system of claim 9, wherein the fuel-based power source is an internal combustion engine.

11. A multi-rotor vehicle system comprising:
    a direct current (DC) powered motor coupleable to a rotor;
    an electronic speed controller coupled to the DC-powered motor to control the speed of the DC-powered motor by regulating electric current supplied to the DC-powered motor;
    a genset subsystem coupled to the electronic speed controller to power the electronic speed controllers through a DC motor bus, wherein the genset subsystem includes:
        a battery set including one or more batteries:
        an alternator having a mechanical movement input and a multiphase alternating current (AC) output; and
        a motor-pen controller having a phase control circuit configurable to rectify the multiphase AC output of the alternator to produce a rectified DC feed to the DC-powered motor; and
        wherein the motor-gen controller is configurable to draw DC power from the battery set to produce the rectified DC feed; and
    an autopilot module to execute a flight plan for the multi-rotor vehicle system; and
    a flight controller operatively coupled to the autopilot module and the electronic speed controller to control the electronic speed controller based on a command from the autopilot module.

12. The multi-rotor vehicle system of claim 11, further comprising:
    a sensor coupled to the electronic speed controller or the DC-powered motor; and
    wherein the flight controller implements a health monitor system that detects a failure or impending failure based on at least a reading of the sensor.

13. The multi-rotor vehicle system of claim 12, wherein the sensor is at least one of a current sensor, a voltage sensor, or a temperature sensor coupled to the electronic speed controller.

14. The multi-rotor vehicle system of claim 12, wherein the sensor is at least one of a temperature sensor or an inertial sensor coupled to the DC-powered motor.

* * * * *